(12) United States Patent
Ishikura et al.

(10) Patent No.: US 9,475,957 B2
(45) Date of Patent: Oct. 25, 2016

(54) AQUEOUS PAINT COMPOSITION AND METHOD OF MANUFACTURING PAINTED ARTICLE

(71) Applicant: KANSAI PAINT CO., LTD., Hyogo (JP)

(72) Inventors: Minoru Ishikura, Kanagawa (JP); Takashi Nakayabu, Kanagawa (JP); Yuki Yamada, Aichi (JP); Katsunori Hirai, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 0 days.

(21) Appl. No.: 14/390,060

(22) PCT Filed: Apr. 4, 2013

(86) PCT No.: PCT/JP2013/060379
§ 371 (c)(1),
(2) Date: Oct. 2, 2014

(87) PCT Pub. No.: WO2013/151143
PCT Pub. Date: Oct. 10, 2013

(65) Prior Publication Data
US 2015/0056376 A1 Feb. 26, 2015

(30) Foreign Application Priority Data
Apr. 4, 2012 (JP) ................ 2012-085687

(51) Int. Cl.
| C09D 167/02 | (2006.01) |
| C09D 171/02 | (2006.01) |
| C09D 175/04 | (2006.01) |
| C09D 133/08 | (2006.01) |
| C08G 18/62 | (2006.01) |
| C08G 18/79 | (2006.01) |
| C08G 18/80 | (2006.01) |
| C08G 18/28 | (2006.01) |
| C09D 5/02 | (2006.01) |
| C08L 61/28 | (2006.01) |

(52) U.S. Cl.
CPC ........... *C09D 167/02* (2013.01); *C08G 18/283* (2013.01); *C08G 18/6254* (2013.01); *C08G 18/792* (2013.01); *C08G 18/8064* (2013.01); *C08G 18/8093* (2013.01); *C09D 5/02* (2013.01); *C09D 133/08* (2013.01); *C09D 171/02* (2013.01); *C09D 175/04* (2013.01); *C08L 61/28* (2013.01); *C08L 2201/50* (2013.01)

(58) Field of Classification Search
CPC .. C09D 167/02; C09D 17/02; C09D 175/04; C09D 133/08; C09D 5/02; C08G 18/8096; C08G 18/792; C08G 18/8064; C08G 18/8093; C08G 18/283; C08G 18/6254; C08L 2201/50; C08L 61/28

USPC ......... 524/501, 507, 513; 427/407.1; 528/45
See application file for complete search history.

(56) References Cited

U.S. PATENT DOCUMENTS

| 4,518,724 | A | * | 5/1985 | Kuwajima | ........... C09D 133/06 523/501 |
| 5,747,558 | A | * | 5/1998 | Nishi | ........... B05D 7/57 523/201 |
| 6,274,693 | B1 | * | 8/2001 | Poth | ........... C08G 18/6254 427/385.5 |
| 6,696,539 | B2 | | 2/2004 | Kobata et al. | |
| 2002/0165335 | A1 | | 11/2002 | Kobata et al. | |
| 2008/0139736 | A1 | | 6/2008 | Yamada et al. | |
| 2009/0075063 | A1 | | 3/2009 | Iida | |
| 2011/0293948 | A1 | | 12/2011 | Tanaka et al. | |
| 2012/0107619 | A1 | * | 5/2012 | Kitagawa | ........... C08G 18/44 428/423.1 |
| 2014/0030528 | A1 | | 1/2014 | Kitagawa et al. | |
| 2014/0031484 | A1 | | 1/2014 | Kobata et al. | |

FOREIGN PATENT DOCUMENTS

| CN | 101200574 A | 6/2008 |
| EP | 1852478 A1 | 11/2007 |
| JP | 59-136361 A | 8/1984 |
| JP | 09-235487 A | 9/1997 |
| JP | 2002153806 A | 5/2002 |
| JP | 2002322238 A | 11/2002 |
| JP | 2004026958 A | 1/2004 |
| JP | 2004043524 A | 2/2004 |
| JP | 2007297545 A | 11/2007 |
| JP | 2009091571 A | 4/2009 |
| JP | 2009155409 A | 7/2009 |
| JP | 2011-131135 A | 7/2011 |
| WO | 01/10539 A1 | 2/2001 |
| WO | 2008050778 A1 | 5/2008 |

(Continued)

OTHER PUBLICATIONS

International Search Report from PCT/JP2013/060379 dated Jul. 16, 2013.
Official Action related to the corresponding Chinese Patent Application No. 201380016699.4 dated Aug. 21, 2015.

*Primary Examiner* — Michael M Bernshteyn
(74) *Attorney, Agent, or Firm* — Millen White Zelano and Branigan, PC

(57) ABSTRACT

The first objective of the present invention is to provide an aqueous paint composition that can form a paint film with excellent smoothness, image clarity, adhesion and water resistance. This aqueous paint is characterized in comprising (A) an aqueous dispersion of an acrylic modified polyester resin, (B) a block polyisocyanate compound having a nonionic hydrophilic group, and (C) an aqueous dispersion of acrylic polymer fine particles.

11 Claims, No Drawings

(56) References Cited

FOREIGN PATENT DOCUMENTS

| WO | 2011010539 | A1 | 1/2011 |
| WO | 2012002569 | A1 | 1/2012 |
| WO | 2012137881 | A1 | 10/2012 |
| WO | 2012137884 | A1 | 10/2012 |

* cited by examiner

AQUEOUS PAINT COMPOSITION AND METHOD OF MANUFACTURING PAINTED ARTICLE

TECHNICAL FIELD

The present invention relates to an aqueous coating composition, and to a method for producing a coated article using the aqueous coating composition.

BACKGROUND ART

Multilayer coating film-forming methods for automobile bodies or automobile parts that are known in the prior art include three-coat, two-bake systems comprising (i) a step of coating an article to be coated (electrodeposited steel sheet, plastic or the like) with a primer coating (intercoat material) and heating it to cure the formed uncured primer coating film, (ii) a step of coating the primer coating film with a base coat material and forming an uncured base coating film, (iii) a step of coating the uncured base coating film with a clear coating material and forming an uncured clear coating film, and (iv) a step of heating to cure the uncured base coating film and the uncured clear coating film.

There is also widely known, as a multilayer coating film-forming method for automobile bodies or automobile parts, a two-coat, two-bake system comprising (i) a step of coating an article to be coated with a primer coating, and heating it to cure the formed uncured primer coating film, (ii) a step of coating the primer coating film with a top coat material and forming an uncured top coating film, and (iii) heating it to cure the uncured top coating film (optionally including a step of preheating after coating of the coating material).

Generally speaking, the three-coat, two-bake system is employed when a "metallic color" coating film is to be formed using a base coat material containing a luster pigment, while the two-coat, two-bake system is employed when a "solid color", such as white or black coating film is to be formed using a top coat material containing a color pigment.

On the other hand, from the viewpoint of shortening the line steps and achieving energy savings in recent years, research has been carried out on 3-coat, 1-bake systems that eliminate the heating step after coating of the primer coating, comprising (i) a step of coating an article to be coated with a primer coating and forming an uncured primer coating film, (ii) a step of coating the uncured primer coating film with a base coat material and forming an uncured base coating film, (iii) a step of coating the uncured base coating film with a clear coating material and forming an uncured clear coating film, and (iv) a step of heating to cure the layered coating films.

Research has also been carried out on 2-coat, 1-bake systems comprising (i) a step of coating an article to be coated with a primer coating and forming an uncured primer coating film, (ii) a step of coating the uncured primer coating film with a top coat material and forming an uncured top coating film, and (iii) a step of heating to cure the layered coating films, and 2-coat, 1-bake systems comprising (i) a step of coating an article to be coated with a base coat material and forming an uncured base coating film, (ii) coating the uncured base coating film with a clear coating material and forming an uncured clear coating film, and (iii) heating to cure the layered coating film (optionally including a step of preheating after coating of the coating material). From the viewpoint of minimizing environmental pollution by volatilization of organic solvents in 3-coat, 1-bake systems and 2-coat, 1-bake systems, there is particular demand for systems employing aqueous coating materials as the base coat material and top coat material.

In these 3-coat, 1-bake systems and 2-coat, 1-bake systems, however, mixing of the coating films takes place between the aqueous base coating film (aqueous top coating film) and the primer coating film or between the aqueous base coating film (aqueous top coating film) and the clear coating film, often reducing the smoothness and distinctness of image of the multilayer coating film that is formed.

In addition, in a base coat material (top coat material) that requires a variety of types for different coating colors, it is possible to reduce costs and improve color matching by using the same for automobile body coating materials and automobile part coating materials. On the other hand, considering the heat resistance (and/or energy efficiency) of plastics as automobile part materials, there has been a desire for coating materials and multilayer coating film-forming methods that allow curing to be accomplished at lower temperatures than the conventional range of 120° C. to 160° C.

However, with conventional aqueous base coat materials (aqueous top coat materials) and multilayer coating film-forming methods, heating at low temperature results in insufficient curing of the multilayer coating film and the adhesion and water resistance of the multilayer coating film has sometimes been reduced.

In PTL 1, for example, there is described a 3-coat, 1-bake type of method of forming a coating film, in which an intercoating film, a base coating film and a clear coating film are formed in that order on a base material in a wet-on-wet manner, wherein the intercoat material forming the intercoating film and the base coating material forming the base coating film comprise an amide group-containing acrylic resin and a curing agent, and the curing agent in the intercoat material comprises an aliphatic isocyanate-based active methylene blocked isocyanate.

PTL 1 teaches that a viscosity-controlling effect is exhibited by the amide group-containing acrylic resin when the aliphatic isocyanate-based active methylene blocked isocyanate used as the curing agent has a mean functional group number of greater than 3, that intermingling and inversion at the interfaces between each of the coating film layers is limited when coating is by a 3-coat, 1-bake method, and also that curing of the intercoating film begins before that of the base coating film and clear coating film, allowing a sufficient flow property to be ensured, and a product results that has an excellent ground layer masking property against roughening of the electrodeposition coating, such that a multilayer coating film is obtained that has an excellent finished appearance and excellent coating properties, and especially chipping resistance.

PTL 2 describes an aqueous coating composition for a second aqueous coating material, for formation of a multilayer coating film by application of a first aqueous coating material, a second aqueous coating material and a clear coating material in that order in a wet-on-wet manner. The aqueous coating composition comprises (a) 40 to 60 parts by mass of an emulsion resin obtained by emulsion polymerization of a monomer mixture containing 0.5 to 10 mass % of a polyfunctional vinyl monomer (amount with respect to the total monomer component), a carboxyl group-containing vinyl monomer, a hydroxyl group-containing vinyl monomer and another vinyl polymerizable monomer, (b) 1 to 5 parts by mass of an amide group-containing water-soluble acrylic resin, (c) 5 to 20 parts by mass of a urethane emulsion and (d) 15 to 35 parts by mass of a curing agent, in 100 parts by mass of resin solid content in the coating composition.

According to PTL 2, due to the crosslinked structure in the emulsion particles, coating in a wet-on-wet manner causes the clear coating material component to infiltrate into the lower layer coating film, or in other words, formation of a mixed layer between the lower layer coating film and upper layer coating film is inhibited, and as a result, the energy required during formation of the multilayer coating film is lowered and a multilayer coating film with an excellent outer appearance and water resistance can be obtained. PTL 2 also teaches that the second aqueous coating material has excellent storage stability, because it comprises (b) an amide group-containing water-soluble acrylic resin, (c) a urethane emulsion and (d) a curing agent.

PTL 3 describes a coating method in which an aqueous primer, aqueous base coat material and clear coating material are coated onto a plastic base material and the three layers are simultaneously baked at a temperature of no higher than 100° C., wherein the aqueous primer comprises an aqueous polyolefin-based resin and an aqueous acrylic-based resin, and the aqueous base coat material comprises an aqueous polyurethane resin, a hydroxyl group-containing aqueous acrylic resin and/or an aqueous polyester resin and a melamine resin, the melamine resin being a butyl/methyl mixed etherified melamine resin and having a weight-average molecular weight in the range of 1500-3000, the clear coating material comprising a hydroxyl group-containing resin and an isocyanate crosslinking agent, and the isocyanate crosslinking agent including a polyisocyanate compound with a urethodione structure and a trimer or greater diisocyanate compound, whereby a multilayer coating film with excellent adhesion, water resistance and durability can be formed.

PTL 4 describes a method of forming a multilayer coating film in which an aqueous intercoat material is coated onto a base material having both a steel sheet and a plastic base material to form an intercoating film, an aqueous base coating material is coated onto the formed intercoating film to form a base coating film, an organic solvent-based clear coating material is coated to form a clear coating film, and the three layers: intercoating film, base coating film and clear coating film are heated for curing, the method of forming a multilayer coating film being characterized in that the aqueous base coating material contains, in 100 mass % of resin solid content, (a) 10 to 60 mass % by solid content of an acrylic resin emulsion obtained by emulsion polymerization of a monomer mixture containing 0.2 to 20 mass % of a crosslinkable monomer, (b) 5 to 40 mass % by solid content of a water-soluble acrylic resin, (c) 20 to 40 mass % by solid content of a melamine resin and (d) 10 to 40 parts by mass of a propylene glycol monoalkyl ether with respect to 100 parts by mass of the coating resin solid content, whereby the outer appearance of the steel sheet and plastic base material become uniform.

CITATION LIST

Patent Literature

[PTL 1] Japanese Unexamined Patent Publication No. 2002-153806
[PTL 2] Japanese Unexamined Patent Publication No. 2007-297545
[PTL 3] International Patent Publication No. WO2008/050778
[PTL 4] Japanese Unexamined Patent Publication No. 2011-131135

SUMMARY OF INVENTION

Technical Problems

In the method of forming a coating film described in PTL 1, however, the storage stability of the active methylene blocked isocyanate is low, sometimes lowering the smoothness and distinctness of image, while insufficient curing sometimes results in reduced adhesion. In the method of forming a coating film described in PTL 2, mixing between the intercoat material and the aqueous base coat material and/or between the aqueous base coat material and the clear coating material lowers the smoothness and distinctness of image of the coating film that is formed, and when the baking temperature is low the water resistance is sometimes reduced due to insufficient curing.

In the method of forming a coating film described in PTL 3, a large film thickness of the base coat and a low film thickness of the clear coat can sometimes result in a lower amount of polyisocyanate compound migrating from the clear coating material into the base coat material and primer coating, and reduced water resistance due to insufficient curing. In the method of forming a coating film according to PTL 4, curing of the multilayer coating film has sometimes been insufficient when the baking temperature falls below 120° C., the base coating film is increased in thickness (to 30 μm or greater) or the clear coating film is decreased in thickness (to less than 20 μm).

It is therefore a first object of the invention to provide an aqueous coating composition that can form a coating film with excellent smoothness, distinctness of image, adhesion and water resistance.

Also, it is a second object of the invention to provide an aqueous coating composition that forms a multilayer coating film with excellent smoothness, distinctness of image, adhesion and water resistance when a plurality of uncured coating films are heat cured at once, and especially when they are heat cured at once at low temperature.

Solution to Problems

The present inventors have avidly conducted research with the object of solving the problems described above. As a result, a specific aqueous coating composition has been found.

The invention provides an aqueous coating composition comprising:
an aqueous dispersion of an acryl-modified polyester resin (A);
a blocked polyisocyanate compound having a nonionic hydrophilic group (B); and
an aqueous dispersion of acrylic-based polymer fine particles (C).

The present invention further provides a method for producing a coated article, comprising a step of applying the aforementioned aqueous coating composition as a base coat material to form an uncured base coating film on the article to be coated, followed by a step of applying a clear coat paint onto the uncured base coating film.

In addition, the invention provides a method for producing a coated article comprising a step of applying the aforementioned aqueous coating composition as a top coat material onto an article to be coated.

Advantageous Effect of Invention

The aqueous coating composition of the invention forms a multilayer coating film with excellent smoothness, distinctness of image, adhesion and water resistance when a plurality of uncured coating films are heat cured at once, and especially when they are heat cured at once at low temperature.

DESCRIPTION OF EMBODIMENTS

The aqueous coating composition of the invention and a method for producing a coated article, will now be explained in detail.

[Aqueous Dispersion of Acryl-Modified Polyester Resin (A)]

An aqueous dispersion of an acryl-modified polyester resin (A) is an acryl-modified polyester resin ($a_1$) dispersed in an aqueous medium. The acryl-modified polyester resin ($a_1$) is a polyester that has been modified with an acryl group, and it is obtained by a known method. The acryl-modified polyester resin ($a_1$) is obtained, for example, by radical polymerization of a radical polymerizable unsaturated group-containing polyester resin ($a_{11}$) and a polymerizable unsaturated monomer ($a_{12}$), or esterification reaction of a polyester resin and an acrylic resin.

The radical polymerization is a method in which the radical polymerizable unsaturated group in the polyester resin is used as the graft point for graft polymerization of the polymerizable unsaturated monomer ($a_{12}$). The radical polymerizable unsaturated group-containing polyester resin ($a_{11}$) is not particularly restricted, and for example, it may be obtained by producing a polyester resin by a known method and then reacting the terminal hydroxyl group with an acid anhydride-containing unsaturated monomer. Alternatively, the radical polymerizable unsaturated group-containing polyester resin ($a_{11}$) can be obtained by esterification reaction or transesterification reaction of an acid component ($a_{111}$) including a polybasic acid with a polymerizable unsaturated group, and an alcohol component ($a_{112}$).

From the viewpoint of smoothness, distinctness of image, adhesion and water resistance of the obtained multilayer coating film, the radical polymerizable unsaturated group-containing polyester resin ($a_{11}$) is preferably produced by the latter method, i.e. by esterification reaction or transesterification reaction of an acid component ($a_{111}$) including a polybasic acid with a polymerizable unsaturated group, and an alcohol component ($a_{112}$). From the viewpoint of smoothness, distinctness of image, adhesion and water resistance of the obtained multilayer coating film, the polybasic acid with a polymerizable unsaturated group most preferably includes an acid anhydride group-containing unsaturated monomer.

The acid anhydride group-containing unsaturated monomer is a compound having one or more acid anhydride groups, and one or more radical polymerizable unsaturated groups, and preferably it is a compound having one each of an acid anhydride group and a radical polymerizable unsaturated group. Examples for the acid anhydride group-containing unsaturated monomer include unsaturated dicarboxylic anhydrides such as maleic anhydride, itaconic anhydride, fumaric anhydride, citraconic anhydride, mesaconic anhydride, tetrahydrophthalic anhydride, 2-pentenedioic anhydride, methylenesuccinic anhydride, allylmalonic anhydride, isopropylidenesuccinic anhydride, 2,4-hexadienedioic anhydride, acetylenedicarboxylic anhydride and 4-cyclohexene-1,2-dicarboxylic anhydride, and from the viewpoint of smoothness, distinctness of image, adhesion and water resistance, maleic anhydride is preferred.

The acid component ($a_{111}$) may include, in addition to the aforementioned acid anhydride group-containing unsaturated monomer, an aliphatic polybasic acid, alicyclic polybasic acid or aromatic polybasic acid, for example.

Examples for the aliphatic polybasic acid include aliphatic compounds having two or more carboxyl groups in the molecule, and acid anhydrides and esters of such aliphatic compounds. Examples for the aliphatic polybasic acid include aliphatic polybasic carboxylic acids such as succinic acid, glutaric acid, adipic acid, pimelic acid, suberic acid, azelaic acid, sebacic acid, undecanedioic acid, dodecanedioic acid, bras sylic acid, octadecanedioic acid, citric acid and butanetetracarboxylic acid; anhydrides of such aliphatic polybasic carboxylic acids; esterification reaction products of such aliphatic polybasic carboxylic acids with approximately C1-C4 lower alkyl groups; and any combinations thereof.

These aliphatic polybasic acids are preferably adipic acid and/or adipic anhydride, from the viewpoint of smoothness of the coating film that is to be obtained.

Alicyclic polybasic acids include compounds having one or more alicyclic structures and two or more carboxyl groups in the molecule, and acid anhydrides or ester compounds of such alicyclic polybasic acids. Such alicyclic polybasic acids have primarily an alicyclic structure with an approximately four- to six-membered ring. Examples of alicyclic polybasic acids include alicyclic polybasic carboxylic acids such as 1,2-cyclohexanedicarboxylic acid, 1,3-cyclohexanedicarboxylic acid, 1,4-cyclohexanedicarboxylic acid, 4-cyclohexene-1,2-dicarboxylic acid, 3-methyl-1,2-cyclohexanedicarboxylic acid, 4-methyl-1,2-cyclohexanedicarboxylic acid, 1,2,4-cyclohexanetricarboxylic acid and 1,3,5-cyclohexanetricarboxylic acid; anhydrides of these alicyclic polybasic carboxylic acids; esterification reaction products of these alicyclic polybasic carboxylic acids with approximately C1-C4 lower alkyl groups; and any combinations thereof.

From the viewpoint of smoothness of the coating film that is to be obtained, the alicyclic polybasic acid is preferably 1,2-cyclohexanedicarboxylic acid, 1,2-cyclohexanedicarboxylic anhydride, 1,3-cyclohexanedicarboxylic acid, 1,4-cyclohexanedicarboxylic acid or 4-cyclohexene-1,2-dicarboxylic acid, and more preferably 1,2-cyclohexanedicarboxylic acid and/or 1,2-cyclohexanedicarboxylic anhydride.

The aforementioned aromatic polybasic acids are generally aromatic compounds with two or more carboxyl groups in the molecule, and esters of such aromatic compounds, examples of which include aromatic polybasic carboxylic acids such as phthalic acid, isophthalic acid, terephthalic acid, naphthalenedicarboxylic acid, 4,4'-biphenyldicarboxylic acid, trimellitic acid and pyromellitic acid; approximately C1-C4 lower alkyl esters of these aromatic polybasic carboxylic acids, and any combinations thereof.

The aromatic polybasic acid is preferably selected from the group consisting of phthalic acid, isophthalic acid and trimellitic acid, and any combinations thereof.

Also, the acid component ($a_{111}$) may include an acid component other than one of the aforementioned aliphatic polybasic acids, alicyclic polybasic acids and aromatic polybasic acids, examples including fatty acids such as coconut fatty acid, cottonseed oil fatty acid, hempseed oil fatty acid, rice bran oil fatty acid, fish oil fatty acid, tall oil fatty acid, soybean oil fatty acid, linseed oil fatty acid, China wood oil fatty acid, rapeseed oil fatty acid, castor oil fatty acid, dehydrated castor oil fatty acid and safflower oil fatty acid; monocarboxylic acids such as lauric acid, myristic acid, palmitic acid, stearic acid, oleic acid, linolic acid, linolenic acid, benzoic acid, p-tert-butylbenzoic acid, cyclohexanoic acid and 10-phenyloctadecanoic acid; and hydroxycarboxylic acids such as lactic acid, 3-hydroxybutanoic acid and 3-hydroxy-4-ethoxybenzoic acid, as well as any combinations thereof.

The alcohol component ($a_{112}$) may be a polyhydric alcohol with two or more hydroxyl groups in the molecule, examples of which include dihydric alcohols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 2-methyl-1,3-propanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentyl glycol, 1,4-cyclohexanedimethanol, tricyclodecanedimethanol, hydroxypivalic acid neopentyl glycol ester, hydrogenated bisphenol A, hydrogenated bisphenol F and dimethylolpropionic acid; polylactone diols with lactone compounds such as ε-caprolactone added to the aforementioned dihydric alcohols; ester diol compounds such as bis(hydroxyethyl)terephthalate; polyether diol compounds such as bisphenol A alkylene oxide addition products, polyethylene glycol, polypropylene glycol and polybutylene glycol; trihydric and greater alcohols such as glycerin, trimethylolethane, trimethylolpropane, diglycerin, triglycerin, 1,2,6-hexanetriol, pentaerythritol, dipentaerythritol, tris(2-hydroxyethyl)isocyanuric acid, sorbitol and mannitol; polylactone polyol compounds with lactone compounds such as ε-caprolactone added to the aforementioned trihydric and greater alcohols; and fatty acid esters of glycerin.

The alcohol component ($a_{112}$) may also be an alcohol component other than the aforementioned polyhydric alcohols, examples of which include monoalcohols such as methanol, ethanol, propyl alcohol, butyl alcohol, stearyl alcohol and 2-phenoxyethanol; and alcohol compounds obtained by reacting acids with monoepoxy compounds such as propylene oxide, butylene oxide, "CARDURA E10" (trade name of HEXION Specialty Chemicals, glycidyl ester of synthetic highly-branched saturated fatty acid), and the like.

Also, the radical polymerizable unsaturated group-containing polyester resin ($a_{11}$) may contain an unsaturated fatty acid such as oleic acid or myristic acid as the acid component ($a_{111}$). In such cases, the radical polymerizable unsaturated group of the unsaturated fatty acid may be used as the graft point.

Also, from the viewpoint of the smoothness and water resistance of the coating film that is to be obtained, the content of alicyclic polybasic acids in the acid component ($a_{111}$) of the aqueous dispersion of an acryl-modified polyester resin (A) is preferably about 20 to about 100 mol %, more preferably about 25 to about 95 mol % and even more preferably about 30 to about 90 mol %, based on the total acid component ($a_{111}$).

The radical polymerizable unsaturated group-containing polyester resin ($a_{11}$) is not particularly restricted, and may be produced according to a known method. For example, the radical polymerizable unsaturated group-containing polyester resin ($a_{11}$) can be produced by heating the acid component ($a_{111}$) and the alcohol component ($a_{112}$) in a nitrogen stream at about 150° C. to about 250° C. for about 5 to about 10 hours, for esterification or transesterification of the acid component ($a_{111}$) and alcohol component ($a_{112}$).

When the acid component ($a_{111}$) and alcohol component ($a_{112}$) are to be subjected to esterification reaction or transesterification reaction, they may be added all at once to the reactor, or one or both may be added in separate portions, or added continuously. Also, after the radical polymerizable unsaturated group-containing polyester resin has been synthesized, the obtained radical polymerizable unsaturated group-containing resin may be reacted for half-esterification, to produce a polyester resin containing a carboxyl group and a hydroxyl group. Also, after the polyester resin containing a radical polymerizable unsaturated group and a carboxyl group has been synthesized, the alcohol component may be added to the polyester resin to produce a polyester resin comprising a radical polymerizable unsaturated group, a carboxyl group and a hydroxyl group.

During the esterification or transesterification reaction, a known catalyst such as dibutyltin oxide, antimony trioxide, zinc acetate, manganese acetate, cobalt acetate, calcium acetate, lead acetate, tetrabutyl titanate or tetraisopropyl titanate may be added to the reaction system as a catalyst to accelerate the reaction.

Also, the radical polymerizable unsaturated group-containing polyester resin ($a_{11}$) may be modified with a fatty acid, fat or oil, monoepoxy compound, polyisocyanate compound or the like, either during or after preparation of the radical polymerizable unsaturated group-containing polyester resin.

Examples for the fatty acid include coconut fatty acid, cottonseed oil fatty acid, hempseed oil fatty acid, rice bran oil fatty acid, fish oil fatty acid, tall oil fatty acid, soybean oil fatty acid, linseed oil fatty acid, China wood oil fatty acid, rapeseed oil fatty acid, castor oil fatty acid, dehydrated castor oil fatty acid and safflower oil fatty acid. The fat or oil may be a fatty acid oil of the aforementioned fatty acid. An example of the monoepoxy compound is "CARDURA E10" (trade name of HEXION Specialty Chemicals, glycidyl ester of synthetic highly-branched saturated fatty acid).

Examples for the polyisocyanate compound include aliphatic diisocyanate compounds such as lysine diisocyanate, hexamethylene diisocyanate and trimethylhexane diisocyanate; alicyclic diisocyanate compounds such as hydrogenated xylylene diisocyanate, isophorone diisocyanate, methylcyclohexane-2,4-diisocyanate, methylcyclohexane-2,6-diisocyanate, 4,4'-methylenebis(cyclohexyl isocyanate) and 1,3-(isocyanatomethyl)cyclohexane; aromatic diisocyanate compounds such as tolylene diisocyanate, xylylene diisocyanate and diphenylmethane diisocyanate; organic polyisocyanates including trivalent and greater polyisocyanates such as lysine triisocyanate; addition products of the aforementioned organic polyisocyanates with polyhydric alcohols, low molecular weight polyester resins, water or the like; cyclized polymers formed between the aforementioned organic polyisocyanates (for example, isocyanurates), biuret-type addition products, and any combinations thereof.

Examples for the polymerizable unsaturated monomer ($a_{12}$) that is copolymerizable with the radical polymerizable unsaturated group-containing polyester resin ($a_{11}$) include the following monomers (i) to (xx), as well as any desired combinations thereof.

(i) Alkyl or cycloalkyl (meth)acrylates:

For example, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth) acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, tert-butylcyclohexyl (meth)acrylate, cyclododecyl (meth)acrylate, tricyclodecanyl (meth)acrylate and the like.

(ii) Polymerizable Unsaturated Monomers with Isobornyl Groups:
Isobornyl (meth)acrylate and the like.

(iii) Polymerizable Unsaturated Monomers with Adamantyl Groups:
Adamantyl (meth)acrylate and the like.

(iv) Polymerizable Unsaturated Monomers with Tricyclodecenyl Groups:
Tricyclodecenyl (meth)acrylate and the like.

(v) Aromatic Ring-Containing Polymerizable Unsaturated Monomers:
Benzyl (meth)acrylate, styrene, α-methylstyrene, vinyltoluene and the like.

(vi) Polymerizable Unsaturated Monomers with Alkoxysilyl Groups:
Vinyltrimethoxysilane, vinyltriethoxysilane, vinyltris(2-methoxyethoxy)silane, γ-(meth)acryloyloxypropyltrimethoxysilane, γ-(meth)acryloyloxypropyltriethoxysilane and the like.

(vii) Polymerizable Unsaturated Monomers with Fluorinated Alkyl Groups:
Perfluoroalkyl (meth)acrylates such as perfluorobutylethyl (meth)acrylate and perfluorooctylethyl (meth)acrylate, and fluoroolefins and the like.

(viii) Polymerizable Unsaturated Monomers with Photopolymerizable Functional Groups such as Maleimide.

(ix) Vinyl Compounds:
N-vinylpyrrolidone, ethylene, butadiene, chloroprene, vinyl propionate, vinyl acetate and the like.

(x) Carboxyl Group-Containing Polymerizable Unsaturated Monomers:
(Meth)acrylic acid, maleic acid, crotonic acid, β-carboxyethyl acrylate and the like.

(xi) hydroxyl Group-Containing Polymerizable Unsaturated Monomers:
Monoesters of (meth)acrylic acid and approximately C2-C8 dihydric alcohols, such as 2-hydroxyethyl (meth)acrylate, 2-hydroxypropyl (meth)acrylate, 3-hydroxypropyl (meth)acrylate and 4-hydroxybutyl (meth)acrylate; ε-caprolactone-modified monoesters of (meth)acrylic acid and approximately C2-C8 dihydric alcohols; N-hydroxymethyl (meth)acrylamide; allyl alcohol; and (meth)acrylates having a polyoxyethylene chain with a hydroxyl group at the molecular end.

(xii) Nitrogen-Containing Polymerizable Unsaturated Monomers:
(Meth)acrylonitrile, (meth)acrylamide, N,N-dimethylaminoethyl (meth)acrylate, N,N-diethylaminoethyl (meth)acrylate, N,N-dimethylaminopropyl (meth)acrylamide, methylenebis (meth)acrylamide, ethylenebis (meth)acrylamide, addition products of glycidyl (meth)acrylate and amine compounds, and the like.

(xiii) Polymerizable Unsaturated Monomers with Two or more Polymerizable Unsaturated Groups in the Molecule:
Allyl (meth)acrylates, 1,6-hexanediol di(meth)acrylate and the like.

(xiv) Epoxy Group-Containing Polymerizable Unsaturated Monomers:
Glycidyl (meth)acrylate, β-methylglycidyl (meth)acrylate, 3,4-epoxycyclohexylmethyl (meth)acrylate, 3,4-epoxycyclohexylethyl( meth)acrylate, 3,4-epoxycyclohexylpropyl (meth)acrylate, allyl glycidyl ether and the like.

(xv) (Meth)acrylates with Polyoxyethylene Chains having Alkoxy Groups at the Molecular Ends (xvi) Polymerizable Unsaturated Monomers with Sulfonic Acid Groups:
2-Acrylamide-2-methylpropanesulfonic acid, 2-sulfoethyl (meth)acrylate, allylsulfonic acid, 4-styrenesulfonic acid and the like; and sodium salts and ammonium salts of these sulfonic acids.

(xvii) Polymerizable Unsaturated Monomers with Phosphate Groups:
Acid phosphooxyethyl (meth)acrylate, acid phosphooxypropyl (meth)acrylate, acid phosphooxypoly(oxyethylene) glycol (meth)acrylate, acid phosphooxypoly(oxypropylene) glycol (meth)acrylates and the like.

(xviii) Polymerizable Unsaturated Monomers with Ultraviolet Absorbing Functional Groups:
2-Hydroxy-4-(3-methacryloyloxy-2-hydroxypropoxy) benzophenone, 2-hydroxy-4-(3-acryloyloxy-2-hydroxypropoxy)benzophenone, 2,2'-dihydroxy-4-(3-methacryloyloxy-2-hydroxypropoxy)benzophenone, 2,2'-dihydroxy-4-(3-acryloyloxy-2-hydroxypropoxy)benzophenone, 2-(2'-hydroxy-5'-methacryloyloxyethylphenyl)-2H-benzotriazole and the like.

(xix) Ultraviolet-Stable Polymerizable Unsaturated Monomers:
4-(Meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth) acryloylamino-2,2,6,6-tetramethylpiperidine, 4-crotonoyloxy-2,2,6,6-tetramethylpiperidine, 4-crotonoylamino-2,2,6,6-tetramethylpiperidine, 1-crotonoyl-4-crotonoyloxy-2,2,6,6-tetramethylpiperidine and the like.

(xx) Polymerizable Unsaturated Monomers with Carbonyl Groups:
Acrolein, diacetoneacrylamide, diacetonemethacrylamide, acetoacetoxyethyl methacrylate, formylstyrol, approximately C4-C7 vinyl alkyl ketones (for example, vinyl methyl ketone, vinyl ethyl ketone and vinyl butyl ketone), and the like.

As used herein, "polymerizable unsaturated group" means an unsaturated group that can participate in radical polymerization. Examples of such polymerizable unsaturated groups include vinyl and (meth)acryloyl.

Also, as used herein, "(meth)acrylate" refers to acrylate and/or methacrylate. The term "(meth)acrylic acid" refers to acrylic acid and/or methacrylic acid. The term "(meth)acryloyl" refers to acryloyl and/or methacryloyl. The term "(meth)acrylamide" refers to acrylamide and/or methacrylamide.

From the viewpoint of ease of grafting with polyester resins and stability of the aqueous dispersion of the acrylic acid-modified polyester resin (A), the acrylic acid-modified polyester resin ($a_1$) preferably includes (x) a carboxyl group-containing polymerizable unsaturated monomer and (v) an aromatic ring-containing polymerizable unsaturated monomer, as polymerizable unsaturated monomers ($a_{12}$).

The acrylic acid-modified polyester resin ($a_1$) includes (x) a carboxyl group-containing polymerizable unsaturated monomer and (v) an aromatic ring-containing polymerizable unsaturated monomer, with
(x) the carboxyl group-containing polymerizable unsaturated monomer at preferably about 5 to about 50 mass %, more preferably about 7 to about 45 mass % and even more preferably about 15 to about 40 mass %, and (v) the aromatic ring-containing polymerizable unsaturated monomer at preferably about 10 to about 60 mass %, more preferably about 15 to about 55 mass % and even more preferably about 20 to about 50 mass %,
based on the total mass of the polymerizable unsaturated monomer.

The acryl-modified polyester resin ($a_1$) is obtained, for example, by copolymerization of a radical polymerizable unsaturated group-containing polyester resin ($a_{11}$) and a polymerizable unsaturated monomer ($a_{12}$), by a known method.

Specifically, the acryl-modified polyester resin ($a_1$) can be obtained, for example, by adding the radical polymerizable unsaturated group-containing polyester resin ($a_{11}$), the polymerizable unsaturated monomer ($a_{12}$), a radical initiator and if necessary a chain transfer agent, into a reactor and heating the mixture at about 90° C. to about 160° C. for about 1 to about 5 hours. When large heat release makes it difficult to control the temperature, the radical polymerizable unsaturated group-containing polyester resin ($a_{11}$) alone is added first into the reactor, and then the other starting materials are added at different timings.

The polymerization initiator may be an organic peroxide-based compound, azo-based compound, or the like. Examples of organic peroxide-based polymerization initiators include benzoyl peroxide, tert-butylperoxy-2-ethylhexanoate, di-tert-butyl peroxide, tert-butyl peroxybenzoate and tert-amylperoxy-2-ethylhexanoate, and examples of azo-based polymerization initiators include azobisisobutyronitrile and azobisdimethylvaleronitrile. Also, the chain transfer agent may be an α-methylstyrene dimer, mercaptane or the like.

From the viewpoint of stably producing the acryl-modified polyester resin ($a_1$), the acryl-modified polyester resin ($a_1$) contains the polymerizable unsaturated monomer ($a_{12}$) in the range of preferably about 10 to about 95 parts by mass, more preferably about 30 to about 90 parts by mass and even more preferably about 65 to about 85 parts by mass, based on 100 parts by mass as the total of the radical polymerizable unsaturated group-containing polyester resin ($a_{11}$) and the polymerizable unsaturated monomer ($a_{12}$).

From the viewpoint of smoothness, distinctness of image, water resistance and adhesion of the coating film that is to be obtained, the acryl-modified polyester resin ($a_1$) has a hydroxyl value of preferably about 0 to about 200 mgKOH/g, more preferably about 10 to about 100 mgKOH/g and even more preferably about 20 to about 60 mgKOH/g.

Also, the acryl-modified polyester resin ($a_1$) may further contain a carboxyl group, in which case from the viewpoint of smoothness, distinctness of image, water resistance and adhesion of the coating film that is to be obtained, it has an acid value of preferably about 0.1 to about 55 mgKOH/g, more preferably about 5 to about 50 mgKOH/g and even more preferably about 10 to about 30 mgKOH/g.

Likewise, from the viewpoint of smoothness, distinctness of image, water resistance and adhesion of the coating film that is to be obtained, the acryl-modified polyester resin ($a_1$) has a number-average molecular weight of preferably about 1,000 to about 20,000, more preferably about 3,000 to about 18,000 and even more preferably about 5,000 to about 15,000.

As used herein, "number-average molecular weight" and "weight-average molecular weight" are the values determined by converting the retention time (retention volume) using gel permeation chromatography (GPC) to polystyrene molecular weight based on the retention time (retention volume) for standard polystyrene of known molecular weight. measured under the same conditions.

Specifically, it is measured using "HLC-8120GPC" (trade name of Tosoh Corp.) as the gel permeation chromatograph, using 4 columns, a "TSKgel G4000HXL", "TSKgel G3000HXL", "TSKgel G2500HXL" and "TSKgel G2000HXL" (all trade names of Tosoh Corp.) as the columns, and using a differential refractometer as the detector, under the conditions of mobile phase: tetrahydrofuran, measuring temperature: 40° C., flow rate: 1 mL/min.

By neutralizing the acryl-modified polyester resin ($a_1$) and then dispersing it in an aqueous medium, it is possible to obtain an aqueous dispersion of an acryl-modified polyester resin (A). The neutralizing agent used for neutralization may be an amine, ammonia or the like. Examples of amines include triethylamine, triethanolamine, dimethylethanolamine, diethylethanolamine and morpholine, with triethylamine and dimethylethanolamine being preferred. The neutralization degree of the acryl-modified polyester resin ($a_1$) is not particularly restricted, but it is neutralized to a range of about 0.3 to about 1.0 equivalents with respect to the carboxyl groups in the acryl-modified polyester resin ($a_1$).

The aqueous medium that is to disperse the acryl-modified polyester resin ($a_1$) may be water, or a mixture of water and an organic solvent. The organic solvent used may be any publicly known one so long as it is an organic solvent that does not impair the stability of the acryl-modified polyester resin ($a_1$) in the aqueous medium.

As organic solvents there are preferred alcohol-based solvents and ether-based solvents. Specific examples of organic solvents include alcohol-based solvents such as n-butanol; and ether-based solvents such as ethyleneglycol monobutyl ether, ethyleneglycol monoisopropyl ether, ethyleneglycol monomethyl ether, propyleneglycol monomethyl ether and diethyleneglycol monoethyl ether.

Also, the organic solvent used may also be an inert organic solvent that does not mix with water, in a range that does not interfere with the stability of the acryl-modified polyester resin ($a_1$) in the aqueous medium. Examples of inert organic solvents that do not mix with water include aromatic hydrocarbon-based solvents such as toluene and xylene, esteric solvents such as ethyl acetate and butyl acetate, and ketone-based solvents such as methyl ethyl ketone and cyclohexanone. From the viewpoint of environmental protection, the aqueous dispersion of an acryl-modified polyester resin (A) contains the organic solvent in an amount of preferably no greater than 50 mass % of the aqueous medium.

Neutralization of the acryl-modified polyester resin ($a_1$) and its dispersion in the aqueous medium may be accomplished by known methods, examples including a method of gradually adding the acryl-modified polyester resin ($a_1$) into a neutralizing agent-containing aqueous medium while stirring, or a method of neutralizing the acryl-modified polyester resin ($a_1$) with a neutralizing agent and then adding the aqueous medium to the neutralized acryl-modified polyester resin ($a_1$) while stirring, or adding the neutralized acryl-modified polyester resin ($a_1$) to the aqueous medium.

[Blocked Polyisocyanate Compound having Nonionic Hydrophilic Group (B)]

The blocked polyisocyanate compound having a nonionic hydrophilic group (B) (hereunder also abbreviated as "blocked polyisocyanate compound (B)") is a compound in which some of the isocyanate groups in a polyisocyanate compound having two or more isocyanate groups in the molecule are modified with nonionic hydrophilic groups, while some or all of the remaining isocyanate groups are blocked with a blocking agent.

In the aqueous coating composition of the invention, the blocked polyisocyanate compound (B) is either dispersed or dissolved in the aqueous medium present in the aqueous coating composition.

The blocked polyisocyanate compound (B) can be obtained, for example, by reacting an active hydrogen-containing compound having a nonionic hydrophilic group ($b_2$) and a blocking agent ($b_3$) with the isocyanate groups of a polyisocyanate compound having two or more isocyanate groups in the molecule ($b_1$) (a blocked polyisocyanate compound having a nonionic hydrophilic group, obtained in this manner, will hereunder also be referred to as "blocked polyisocyanate compound having a nonionic hydrophilic group ($B_1$)").

When the isocyanate groups of the polyisocyanate compound having two or more isocyanate groups in the molecule ($b_1$) (hereunder also referred to as "polyisocyanate compound ($b_1$)"), the active hydrogen-containing compound having a nonionic hydrophilic group ($b_2$) (hereunder also referred to as "active hydrogen-containing compound (b2)") and the blocking agent ($b_3$) are reacted, there is no particular restriction on the order of reaction of the polyisocyanate compound ($b_1$), the active hydrogen-containing compound (b2) and the blocking agent ($b_3$).

Specifically, after the active hydrogen-containing compound (b2) has been reacted with some of the isocyanate groups of the polyisocyanate compound ($b_1$), the remaining isocyanate groups may be blocked with the blocking agent ($b_3$), or after some of the isocyanate groups of the polyisocyanate compound ($b_1$) have been blocked with the blocking agent ($b_3$), the active hydrogen-containing compound (b2) may be reacted with the remaining isocyanate groups, or the active hydrogen-containing compound (b2) and blocking agent ($b_3$) may be reacted at once with the isocyanate groups of the polyisocyanate compound ($b_1$).

[Polyisocyanate Compound having Two or more Isocyanate Groups in the Molecule ($b_1$)]

The polyisocyanate compound having two or more isocyanate groups in the molecule ($b_1$) is not particularly restricted so long as it is a compound having two or more isocyanate groups in the molecule, and examples include aliphatic polyisocyanates, alicyclic polyisocyanates, aromatic aliphatic polyisocyanates, aromatic polyisocyanates and their derivatives, as well as any combinations thereof.

Examples of aliphatic polyisocyanates include aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate and methyl 2,6-diisocyanatohexanoate (common name: lysine diisocyanate); and aliphatic triisocyanates such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane and 2,5,7-trimethyl-1,8-diisocyanato-5-isocyanatomethyloctane.

Examples of alicyclic polyisocyanates include alicyclic diisocyanates such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name: hydrogenated TDI), 2-methyl-1,3-cyclohexylene diisocyanate, 1,3- or 1,4-bis(isocyanatomethyl)cyclohexane (common name: hydrogenated xylylene diisocyanate) or mixtures thereof, methylenebis(4,1-cyclohexanediyl)diisocyanate (common name: hydrogenated MDI) and norbornane diisocyanate; and alicyclic triisocyanates such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1) heptane, 2-(3-isocyanatopropyl)-2,6-di(isocyanatomethyl)-bicyclo(2.2.1)heptane, 3-(3-isocyanatopropyl)-2,5-di (isocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)-heptane and 6-(2-isocyanatoethyl)-2-isocyanatomethyl-2-(3-isocyanatopropyl)-bicyclo(2.2.1)heptane.

Examples of aromatic/aliphatic polyisocyanates include aromatic/aliphatic diisocyanates such as methylenebis(4,1-phenylene)diisocyanate (common name: MDI), 1,3- or 1,4-xylylene diisocyanate or mixtures thereof, ω,ω'-diisocyanato-1,4-diethylbenzene and 1,3- or 1,4-bis(1-isocyanato-1-methylethyl)benzene (common name: tetramethylxylylene diisocyanate) or mixtures thereof; and aromatic/aliphatic triisocyanates such as 1,3,5-triisocyanatomethylbenzene.

Examples of aromatic polyisocyanates include aromatic diisocyanates such as m-phenylene diisocyanate, p-phenylene diisocyanate, 4,4'-diphenyl diisocyanate, 1,5-naphthalene diisocyanate, 2,4-tolylene diisocyanate (common name: 2,4-TDI) or 2,6-tolylene diisocyanate (common name: 2,6-TDI), or mixtures thereof, 4,4'-toluidine diisocyanate and 4,4'-diphenyl ether diisocyanate; aromatic triisocyanates such as triphenylmethane-4,4',4"-triisocyanate, 1,3,5-triisocyanatobenzene and 2,4,6-triisocyanatotoluene; and aromatic tetraisocyanates such as 4,4'-diphenylmethane-2,2',5,5'-tetraisocyanate.

Examples of the aforementioned derivatives include the aforementioned polyisocyanate dimers, trimers, biurets, allophanates, urethodiones, urethoimines, isocyanurates, oxadiazinetriones, polymethylenepolyphenyl polyisocyanate (crude MDI, polymeric MDI), crude TDI, and the like.

From the viewpoint of helping to prevent yellowing of the blocked polyisocyanate compound having a nonionic hydrophilic group (B) during heating, the polyisocyanate compound ($b_1$) is preferably an aliphatic diisocyanate, an alicyclic diisocyanate or a derivative thereof, and from the viewpoint of flexibility of the coating film that is to be formed, an aliphatic diisocyanate or its derivative is more preferred.

Also, the polyisocyanate compound ($b_1$) may be a prepolymer produced by reacting a compound obtained by reaction between the polyisocyanate and/or its derivative and a polyisocyanate, under conditions with an excess of isocyanate groups. Examples of compounds that can react with the aforementioned polyisocyanates include compounds with active hydrogen groups such as hydroxyl and amino, and specific examples include polyhydric alcohols, low molecular weight polyester resins, amines, water and the like.

The polyisocyanate compound ($b_1$) may also be a polymer or copolymer of an isocyanate group-containing polymerizable unsaturated monomer.

The polyisocyanate compound ($b_1$) has a number-average molecular weight of preferably about 300 to about 20,000, more preferably about 400 to about 8,000 and even more preferably about 500 to about 2,000, from the viewpoint of reactivity of the blocked polyisocyanate compound (B) that is to be obtained and compatibility between the blocked polyisocyanate compound (B) and the other coating material components.

The polyisocyanate compound ($b_1$) also preferably has a mean number of isocyanate functional groups in the molecule of about 2 to about 100, from the viewpoint of reactivity of the blocked polyisocyanate compound (B) that is to be obtained and compatibility between the blocked polyisocyanate compound (B) and the other coating material components. The mean number of isocyanate functional groups is preferably about 3 or greater from the viewpoint of increasing the reactivity of the blocked polyisocyanate compound (B) that is to be obtained. From the viewpoint of preventing gelling during production of the blocked polyisocyanate compound (B), the mean number of isocyanate functional groups is also more preferably no greater than about 20.

[Active Hydrogen-Containing Compound having a Nonionic Hydrophilic Group ($b_2$)]

Examples for the active hydrogen-containing compound having a nonionic hydrophilic group ($b_2$) include active hydrogen-containing compounds having polyoxyalkylene groups. Examples of polyoxyalkylene groups include polyoxyethylene, polyoxypropylene and any desired combinations thereof, such as polyoxyethylene(oxypropylene). From the viewpoint of storage stability of the blocked polyisocyanate compound (B), the active hydrogen-containing compound (b2) is preferably an active hydrogen-containing compound ($b_{21}$) with a polyoxyethylene group.

The active hydrogen-containing compound ($b_{21}$) having a polyoxyethylene group has about 3 or more, preferably about 5 to about 100 and more preferably about 8 to about 45 contiguous oxyethylene groups (polyoxyethylene groups), from the viewpoint of storage stability of the obtained blocked polyisocyanate compound (B), and water resistance of the coating film that is to be formed.

Also, the active hydrogen-containing compound having a polyoxyethylene group ($b_{21}$) may contain oxyalkylene groups other than oxyethylene groups, in addition to the contiguous oxyethylene groups. Examples of oxyalkylene groups other than the oxyethylene groups include oxypropylene, oxybutylene and oxyhexylene. The molar ratio of oxyethylene groups among the oxyalkylene groups in the active hydrogen-containing compound having a polyoxyethylene group ($b_{21}$) is preferably in the range of about 20 to about 100 mol % and more preferably in the range of about 50 to about 100 mol %, from the viewpoint of storage stability after aqueous dispersion of the blocked polyisocyanate compound (B) that is to be obtained. If the molar ratio of oxyethylene groups among the oxyalkylene groups is less than about 20 mol %, the hydrophilicity imparted may be inadequate, and the storage stability of the blocked polyisocyanate compound having a nonionic hydrophilic group (B) that is to be obtained may be reduced.

Also, the active hydrogen-containing compound having a nonionic hydrophilic group ($b_2$) preferably has a number-average molecular weight of about 200 to about 2,000, from the viewpoint of storage stability of the blocked polyisocyanate compound (B) and water resistance of the coating film that is to be formed. The number-average molecular weight is more preferably about 300 or greater and even more preferably about 400 or greater, from the viewpoint of the storage stability of the blocked polyisocyanate compound (B) that is to be obtained. The number-average molecular weight is also more preferably no greater than about 1,500 and even more preferably no greater than about 1,200 from the viewpoint of the water resistance of the coating film that is to be formed.

Examples for the active hydrogen-containing compound having a nonionic hydrophilic group ($b_2$) include polyethyleneglycol monoalkyl ethers (alternate name: ω-alkoxypolyoxyethylenes) such as polyethyleneglycol monomethyl ether and polyethyleneglycol monoethyl ether, polypropyleneglycol monoalkyl ethers (alternate name: ω-alkoxypolyoxypropylenes) such as polypropyleneglycol monomethyl ether and polypropyleneglycol monoethyl ether, ω-alkoxypolyoxyethylene(oxypropylene)s such as ω-methoxypolyoxyethylene(oxypropylene) and ω-ethoxypolyoxyethylene (oxypropylene), polyethyleneglycol (propyleneglycol) monoalkyl ethers such as polyethyleneglycol(propylene glycol) monomethyl ether and polyethyleneglycol(propyleneglycol) monoethyl ether, and polyethylene glycol, polypropylene glycol, polyethyleneglycol(propylene glycol), α-(aminoalkyl)-ω-alkoxypolyoxyethylene, α-(aminoalkyl)-ω-alkoxypolyoxypropylene, α-(aminoalkyl)-ω-alkoxypolyoxyethylene and the like, as well as any combinations thereof, with polyethyleneglycol monomethyl ether, polyethyleneglycol monoethyl ether and polyethyleneglycol being preferred, and polyethyleneglycol monomethyl ether being more preferred.

As used herein, "polyethylene glycol(propylene glycol)" means a copolymer of ethylene glycol and propylene glycol, and it includes their block copolymers and random copolymers.

Examples of commercial products of polyethyleneglycol monomethyl ether include "UNIOX M-400", "UNIOX M-550", "UNIOX M-1000" and "UNIOX M-2000" by NOF Corp. Also, examples of commercial products of polyethylene glycol include "PEG #200", "PEG #300", "PEG #400", "PEG #600", "PEG #1000", "PEG #1500", "PEG #1540" and "PEG #2000" by NOF Corp.

When the active hydrogen-containing compound ($b_2$) is to be reacted with some of the isocyanate groups in the polyisocyanate compound ($b_1$), the polyisocyanate compound ($b_1$) and the active hydrogen-containing compound (b2) are preferably reacted in such a manner that the number of moles of active hydrogen in the active hydrogen-containing compound ($b_2$) is in the range of about 0.03 to about 0.6 mol based on 1 mol of isocyanate groups in the polyisocyanate compound ($b_1$), from the viewpoint of storage stability and curability of the blocked polyisocyanate compound (B) that is to be obtained, and adhesion, smoothness, distinctness of image and water resistance of the coating film that is to be formed.

The number of moles of active hydrogen in the active hydrogen-containing compound ($b_2$) is preferably no greater than about 0.4 and more preferably no greater than about 0.3, from the viewpoint of curability of the blocked polyisocyanate compound (B) that is to be obtained, and water resistance of the coating film that is to be formed. The number of moles of active hydrogen in the active hydrogen-containing compound ($b_2$) is preferably about 0.04 or greater and more preferably about 0.05 or greater, from the viewpoint of storage stability of the blocked polyisocyanate compound (B) that is to be obtained, and adhesion, smoothness, distinctness of image and water resistance of the coating film that is to be formed.

[Blocking Agent ($b_3$)]

For example, the blocking agent ($b_3$) may be phenol-based, alcohol-based, active methylene-based, mercaptane-based, acid amide-based, acid imide-based, imidazole-based, urea-based, oxime-based, amine-based, imine-based, or any combinations thereof. The following are specific examples for the blocking agent ($b_3$).
(1) Phenol-Based;
  Phenol, cresol, ethylphenol, butylphenol and the like.
(2) Alcohol-Based;
  Ethylene glycol, benzyl alcohol, methanol, ethanol and the like.
(3) Active Methylene-Based;
  Malonic acid diesters, acetoacetic acid esters, isobutyrylacetic acid esters, and the like.
(4) Mercaptane-Based;
  Butylmercaptane, dodecylmercaptane and the like.
(5) Acid Amide-Based;
  Acetoanilide, acetic acid amide, ε-caprolactam, δ-valerolactam, γ-butyrolactam and the like.
(6) Acid Imide-Based;
  Succinic acid imide, maleic acid imide and the like.
(7) Imidazole-Based;
  Imidazole, 2-methylimidazole and the like.
(8) Urea-Based;
  Urea, thiourea, ethyleneurea and the like.
(9) Oxime-Based;
  Formaldoxime, acetaldoxime, methylethylketooxime, cyclohexanoneoxime and the like.
(10) Carbamic Acid-Based;
  Phenyl N-phenylcarbamate, and the like.
(11) Amine-Based;
  Diphenylamine, aniline, carbazole and the like.
(12) Imine-Based;
  Ethyleneimine, polyethyleneimine and the like.

A reaction catalyst may be used if desired for the blocking reaction of the isocyanate groups with the blocking agent ($b_3$). Examples for the reaction catalyst include basic compounds such as metal hydroxides, metal alkoxides, metal carboxylates, metal acetylacetonates, onium salt hydroxides, onium carboxylates, metal salts of active methylene compounds, onium salts of active methylene compounds, aminosilanes, amines, phosphines, and the like.

The onium salt is preferably an ammonium salt, phosphonium salt or sulfonium salt. The amount of reaction catalyst used is usually in the range of preferably about 10 to about 10,000 ppm and more preferably in the range of about 20 to about 5,000 ppm, based on the total solid mass of the polyisocyanate compound ($b_1$) and the blocking agent ($b_3$).

Also, blocking of the isocyanate groups by the blocking agent ($b_3$) can be optionally carried out at about 0° C. to about 150° C., in the presence of a solvent. The solvent is preferably an aprotic solvent, and is more preferably an ester, ether, N-alkylamide, ketone or the like. After the reaction has proceeded as determined, an acid component may be added to neutralize the basic compound used as the catalyst, and halt the reaction.

There are no particular restrictions on the amount of the blocking agent ($b_3$) in the blocking reaction of the isocyanate groups by the blocking agent ($b_3$), but it is preferably added in a ratio of about 0.1 to about 3 mol and more preferably about 0.2 to about 2 mol, with respect to 1 mol of isocyanate groups in the polyisocyanate compound ($b_1$). Also, the blocking agent that has not reacted with isocyanate groups in the polyisocyanate compound ($b_1$) may be removed after completion of the blocking reaction.

The blocking agent ($b_3$) is preferably an active methylene-based compound from the viewpoint of the low-temperature curing properties of the coating film that is to be formed.

The blocked polyisocyanate compound ($B_1$) is preferably a blocked polyisocyanate compound ($B_{11}$) or blocked polyisocyanate compound ($B_{12}$), from the viewpoint of stability of the aqueous coating composition.

[Blocked Polyisocyanate Compound having Nonionic Hydrophilic Group ($B_{11}$)]

The blocked polyisocyanate compound having a nonionic hydrophilic group ($B_{11}$) (hereunder also referred to as "blocked polyisocyanate compound ($B_{11}$)") has a blocked isocyanate group represented by the following formula (IV):

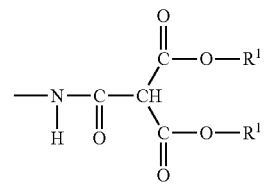

(IV)

(wherein each $R^1$ independently represents an approximately C1-C12 hydrocarbon group, and each $R^1$ may be the same or different),
and a nonionic hydrophilic group.

The blocked polyisocyanate compound ($B_{11}$) is preferably one wherein $R^1$ is an approximately C1-C3 alkyl group, from the viewpoint of allowing use of an active methylene-based compound that can be relatively easily produced, as the blocking agent ($b_3$).

From the viewpoint of improving compatibility between the blocked polyisocyanate compound ($B_1$) that is to be obtained and the other coating material components, $R^1$ is more preferably a C2 or C3 alkyl group, and from the viewpoint of storage stability of the blocked polyisocyanate compound ($B_1$) that is to be obtained and the smoothness and distinctness of image of the coating film that is to be formed, $R^1$ is more preferably an isopropyl group.

The blocked polyisocyanate compound ($B_{11}$) may be obtained, for example, by reacting the polyisocyanate compound ($b_1$) with the active hydrogen-containing compound (b2) and with a dialkyl malonate having an approximately C1-C12 hydrocarbon group, as the blocking agent ($b_3$).

Examples for the dialkyl malonate include dimethyl malonate, diethyl malonate, di-n-propyl malonate, di-isopropyl malonate, di-n-butyl malonate, di-isobutyl malonate, di-sec-butyl malonate, di-tert-butyl malonate, di-n-pentyl malonate, di-n-hexyl malonate, di(2-ethylhexyl)malonate and any combinations thereof, preferably dimethyl malonate, diethyl malonate, di-n-propyl malonate, di-isopropyl malonate, di-n-butyl malonate, di-isobutyl malonate, di-sec-butyl malonate and di-tert-butyl malonate, more preferably diethyl malonate, di-n-propyl malonate and di-isopropyl malonate, and even more preferably di-isopropyl malonate.

[Blocked Polyisocyanate Compound having Nonionic Hydrophilic Group ($B_{12}$)]

The blocked polyisocyanate compound having a nonionic hydrophilic group ($B_{12}$) (hereunder also referred to as "blocked polyisocyanate compound ($B_{12}$)") has a blocked isocyanate group represented by the following formula (V):

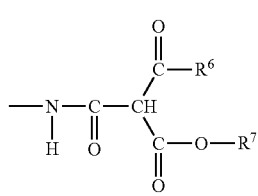

(V)

(wherein $R^6$ and $R^7$ each independently represent an approximately C1-C12 hydrocarbon group),
and a nonionic hydrophilic group.

The blocked polyisocyanate compound ($B_{12}$) is preferably one wherein $R^6$ and $R^7$ are approximately C1-C3 alkyl groups, from the viewpoint of allowing use of an active methylene-based compound that can be relatively easily produced, as the blocking agent ($b_3$).

Also, from the viewpoint of improving compatibility between the blocked polyisocyanate compound ($B_1$) that is to be obtained and the other coating material components, $R^6$ and $R^7$ are preferably approximately C2 or C3 alkyl groups, and from the viewpoint of storage stability of the blocked polyisocyanate compound ($B_1$) that is to be obtained and the smoothness and distinctness of image of the coating film that is to be formed, $R^6$ and $R^7$ are more preferably isopropyl groups.

The blocked polyisocyanate compound ($B_{12}$) may be obtained, for example, by reacting the polyisocyanate compound ($b_1$), the active hydrogen-containing compound ($b_2$), and an acetoacetic acid ester having an approximately C1-C12 hydrocarbon group or an isobutyrylacetic acid ester having an approximately C1-C12 hydrocarbon group, as the blocking agent ($b_3$). The blocking agent ($b_3$) is preferably an isobutyrylacetic acid ester having an approximately C1-C12 hydrocarbon group.

Examples for the isobutyrylacetic acid ester include methyl isobutyrylacetate, ethyl isobutyrylacetate, n-propyl isobutyrylacetate, isopropyl isobutyrylacetate, n-butyl isobutyrylacetate, isobutyl isobutyrylacetate, sec-butyl isobutyrylacetate, tert-butyl isobutyrylacetate, n-pentyl isobutyrylacetate, n-hexyl isobutyrylacetate, 2-ethylhexyl isobutyrylacetate, phenyl isobutyrylacetate, benzyl isobutyrylacetate, and any combinations thereof. Preferred as the isobutyrylacetic acid ester are methyl isobutyrylacetate, ethyl isobutyrylacetate and isopropyl isobutyrylacetate.

Also, examples for the acetoacetic acid ester include methyl acetoacetate, ethyl acetoacetate, n-propyl acetoacetate, isopropyl acetoacetate, n-butyl acetoacetate, isobutyl acetoacetate, sec-butyl acetoacetate, tert-butyl acetoacetate, n-pentyl acetoacetate, n-hexyl acetoacetate, 2-ethylhexyl acetoacetate, phenyl acetoacetate, benzyl acetoacetate and any combinations thereof. Preferred for the acetoacetic acid ester are methyl acetoacetate, ethyl acetoacetate and isopropyl acetoacetate.

From the viewpoint of stability in water, the blocked polyisocyanate compound (B) is preferably a blocked polyisocyanate compound having a nonionic hydrophilic group (hereunder referred to as "blocked polyisocyanate compound having a nonionic hydrophilic group ($B_2$)"), obtained by further reacting a secondary alcohol ($b_4$) with the blocked polyisocyanate compound ($B_1$).

[Blocked Polyisocyanate Compound having Nonionic Hydrophilic Group ($B_2$)]

The blocked polyisocyanate compound having a nonionic hydrophilic group ($B_2$) (hereunder also referred to as "blocked polyisocyanate compound ($B_2$)") can be obtained, for example, by reacting the blocked polyisocyanate compound ($B_1$) with a secondary alcohol ($b_4$) represented by the following formula (VI):

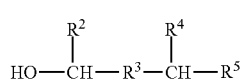

(VI)

(wherein $R^2$, $R^4$ and $R^5$ each independently represent an approximately C1-C12 hydrocarbon group, and $R^3$ represents an approximately C1-C12 straight-chain or branched alkylene group).

[Secondary Alcohol ($b_4$)]

The secondary alcohol ($b_4$) is a compound represented by formula (VI), wherein $R^2$ is preferably a methyl group from the viewpoint of increasing the reactivity between the blocked polyisocyanate compound ($B_1$) and the secondary alcohol ($b_4$). Also, if $R^3$, $R^4$ and $R^5$ each have high carbon numbers the polarity of the obtained blocked polyisocyanate compound having a nonionic hydrophilic group ($B_2$) may be reduced and compatibility with the other coating material components may be lowered, and therefore $R^3$ is preferably an approximately C1-C3 alkylene group, and $R^4$ and $R^5$ are preferably methyl groups.

Examples for the secondary alcohol ($b_4$) include 4-methyl-2-pentanol, 5-methyl-2-hexanol, 6-methyl-2-heptanol and 7-methyl-2-octanol, as well as any combinations thereof. The secondary alcohol ($b_4$) is preferably 4-methyl-2-pentanol which has a relatively low boiling point, since this will help facilitate distillation removal of some or all of the unreacted secondary alcohol ($b_4$) following reaction between the blocked polyisocyanate compound having a nonionic hydrophilic group ($B_1$) and the secondary alcohol ($b_4$).

The blocked polyisocyanate compound ($B_2$) is preferably a blocked polyisocyanate compound having a nonionic hydrophilic group ($B_{21}$) or a blocked polyisocyanate compound having a nonionic hydrophilic group ($B_{22}$), from the viewpoint of stability of the aqueous coating composition.

[Blocked Polyisocyanate Compound having Nonionic Hydrophilic Group ($B_{21}$)]

The blocked polyisocyanate compound having a nonionic hydrophilic group ($B_{21}$) (hereunder also referred to as "blocked polyisocyanate compound ($B_{21}$)") can be obtained, for example, by reacting a blocked polyisocyanate compound ($B_{11}$) having a blocked isocyanate group represented by the following formula (IV):

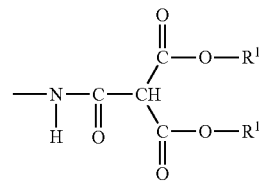

(IV)

(wherein each $R^1$ group independently represents a C1-12 hydrocarbon group, and each $R^1$ may be the same or different)

and a nonionic hydrophilic group, with a secondary alcohol ($b_4$).

In this reaction, one or both of the $R^1$ groups in the blocked polyisocyanate compound ($B_{11}$) is replaced with a group represented by the following formula (VII):

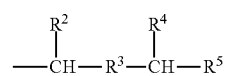

(VII)

(wherein $R^2$, $R^4$ and $R^5$ each independently represent an approximately C1-C12 hydrocarbon group, and $R^3$ represents an approximately C1-C12 straight-chain or branched alkylene group).

The blocked polyisocyanate compound (B) obtained by this reaction has a blocked isocyanate group represented by the following formula (I):

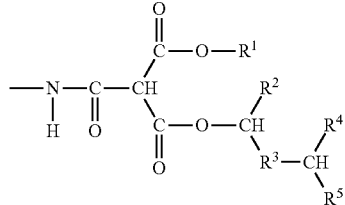

(I)

(wherein $R^1$, $R^2$, $R^4$ and $R^5$ each independently represent an approximately C1-C12 hydrocarbon group, and $R^3$ represents an approximately C1-C12 straight-chain or branched alkylene group),
and/or a blocked isocyanate group represented by the following formula (II):

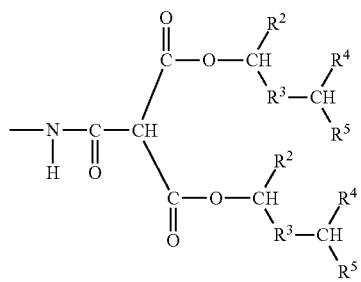

(II)

(wherein $R^2$, $R^3$, $R^4$ and $R^5$ are as defined above).

The reaction between the blocked polyisocyanate compound ($B_{11}$) and the secondary alcohol ($b_4$) is not particularly restricted so long as it is by a method allowing at least one of the $R^1$ groups of the blocked polyisocyanate compound ($B_{11}$) to be replaced with a group represented by formula (VII). For the reaction, preferably some or all of the alcohols derived from at least one $R^1$ group in the blocked polyisocyanate compound ($B_{11}$) are distilled out of the system by heating and pressure reduction or the like, thereby promoting reaction to obtain a blocked polyisocyanate compound ($B_{21}$) having a blocked isocyanate group represented by formula (I) or (II) and a nonionic hydrophilic group.

In this method, some or all of the alcohol is usually removed at a temperature of about 20° C. to about 150° C. and preferably about 75° C. to about 95° C., optionally under reduced pressure, for about 5 minutes to about 20 hours and more preferably about 10 minutes to about 10 hours. If the temperature is too low, the exchange reaction of alkoxy groups in the blocked polyisocyanate compound ($B_{11}$) will be delayed and the production efficiency may be reduced, while if the temperature is too high, decomposition of the blocked polyisocyanate compound (B) will occur and the curability may be lowered.

[Blocked Polyisocyanate Compound having Nonionic Hydrophilic Group ($B_{22}$)]

The blocked polyisocyanate compound having a nonionic hydrophilic group ($B_{22}$) (hereunder also referred to as "blocked polyisocyanate compound ($B_{22}$)") can be obtained, for example, by reacting a blocked polyisocyanate compound ($B_{12}$) having a blocked isocyanate group represented by the following formula (V)):

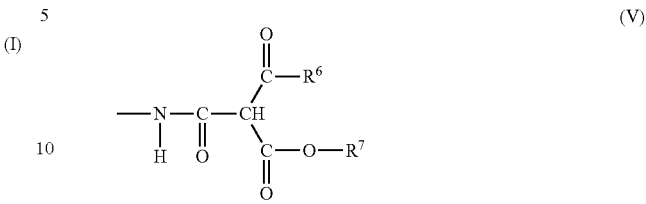

(V)

(wherein $R^6$ and $R^7$ each independently represent a C1-12 hydrocarbon group) and a nonionic hydrophilic group, with a secondary alcohol ($b_4$).

In this reaction, the $R^7$ group in the blocked polyisocyanate compound ($B_{12}$) is replaced with a group represented by the following formula (VII):

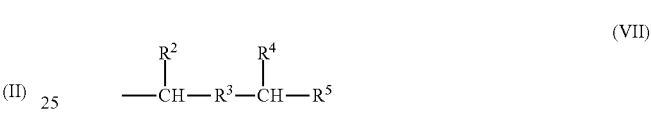

(VII)

(wherein $R^2$, $R^4$ and $R^5$ each independently represent a C1-C12 hydrocarbon group, and $R^3$ represents a C1-C12 straight-chain or branched alkylene group).

In the reaction, the blocked polyisocyanate compound (B) obtained by the reaction has a blocked isocyanate group represented by the following formula (III):

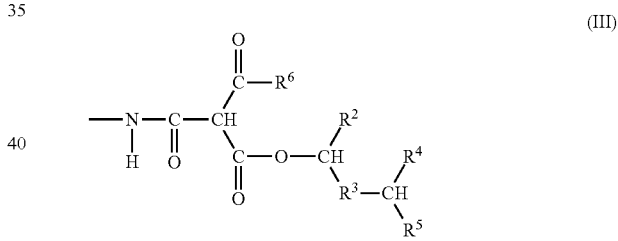

(III)

(wherein $R^2$, $R^3$, $R^4$ and $R^5$ are as defined above, and $R^6$ represents an approximately C1-C12 hydrocarbon group).

The reaction between the blocked polyisocyanate compound ($B_{12}$) and the secondary alcohol ($b_4$) is not particularly restricted so long as it is by a method allowing the $R^7$ group of the blocked polyisocyanate compound ($B_{12}$) to be replaced with a group represented by formula (VII). For the reaction, preferably some or all of the alcohols derived from the $R^7$ group in the blocked polyisocyanate compound ($B_{12}$) are distilled out of the system by heating and pressure reduction or the like, thereby promoting reaction to obtain a blocked polyisocyanate compound ($B_{22}$) having a blocked isocyanate group represented by formula (III) and a nonionic hydrophilic group.

In this method, some or all of the alcohol is usually removed at a temperature of about 20° C. to about 150° C. and preferably about 75° C. to about 95° C., optionally under reduced pressure, for about 5 minutes to about 20 hours and more preferably about 10 minutes to about 10 hours. If the temperature is too low, the exchange reaction of alkoxy groups in the blocked polyisocyanate compound ($B_{12}$) will be delayed and the production efficiency may be reduced, while if the temperature is too high, decomposition of the blocked polyisocyanate compound ($B_2$) may occur and the curability may be lowered.

Also, the proportions of the blocked polyisocyanate compound precursor ($B_1$) and the secondary alcohol ($b_4$) for production of the blocked polyisocyanate compound ($B_2$), from the viewpoint of reactivity of the blocked polyisocyanate compound (B) that is to be obtained and production efficiency, are such that the secondary alcohol ($b_4$) is preferably in the range of about 5 to about 500 parts by mass and more preferably in the range of about 10 to about 200 parts by mass with respect to 100 parts by solid mass of the blocked polyisocyanate compound precursor ($B_1$).

If the proportion of the secondary alcohol ($b_4$) is less than about 5 parts by mass, the reaction rate between the blocked polyisocyanate compound ($B_1$) and the secondary alcohol ($b_4$) may be too slow. Also, if the proportion of the secondary alcohol ($b_4$) is greater than about 500 parts by mass, the concentration of the produced blocked polyisocyanate compound ($B_2$) may be reduced, lowering the production efficiency.

Also, in order to adjust the molecular weight of the blocked polyisocyanate compound ($B_2$) in the reaction between the blocked polyisocyanate compound ($B_1$) and the secondary alcohol ($b_4$), the removal procedure may be carried out after adding a polyol compound to the blocked polyisocyanate compound ($B_1$) and secondary alcohol ($b_4$).

The reason for the excellent stability in water of the blocked polyisocyanate compound ($B_{21}$) and the blocked polyisocyanate compound ($B_{22}$) is conjectured to be that these are relatively stable in water because they have nonionic hydrophilic groups, and that because they have hydrocarbon groups with a branched structure, the blocked isocyanate groups have reduced polarity and are resistant to hydrolysis.

The blocked polyisocyanate compound (B) preferably has a number-average molecular weight of about 600 to about 30,000, from the viewpoint of compatibility with the other coating material components, and smoothness, distinctness of image, adhesion, water resistance and chipping resistance of the coating film that is to be formed. The number-average molecular weight is also more preferably no greater than about 10,000 and even more preferably no greater than about 5,000 from the viewpoint of compatibility with the other coating material components and smoothness and distinctness of image of the multilayer coating film that is to be formed. The number-average molecular weight is also more preferably about 900 or greater and even more preferably about 1,000 or greater from the viewpoint of the adhesion, water resistance and chipping resistance of the multilayer coating film that is to be formed.

Also, the blocked polyisocyanate compound (B) may be a mixture with a surfactant. The surfactant is preferably a nonionic surfactant from the viewpoint of stability of the aqueous coating composition.

[Aqueous Dispersion of Acrylic-Based Polymer Fine Particles (C)]

An aqueous dispersion of acrylic-based polymer fine particles (C) consists of acrylic-based polymer fine particles dispersed in an aqueous medium. The aqueous dispersion of acrylic-based polymer fine particles (C) can be produced, for example, by copolymerizing a known polymerizable unsaturated monomer by a known method such as an emulsion polymerization method in water or a miniemulsion polymerization method in water.

Also, from the viewpoint of improving the smoothness, distinctness of image and water resistance of the multilayer coating film that is to be formed, the aqueous dispersion of acrylic-based polymer fine particles (C) preferably includes an aqueous dispersion of hydroxyl group-containing acrylic-based polymer fine particles ($C_1$) as at least one type.

The aqueous dispersion of hydroxyl group-containing acrylic-based polymer fine particles ($C_1$) can be produced, for example, by copolymerizing a hydroxyl group-containing polymerizable unsaturated monomer and another polymerizable unsaturated monomer that is copolymerizable with the hydroxyl group-containing polymerizable unsaturated monomer, by a known method such as an emulsion polymerization method in water or a miniemulsion polymerization method in water.

The hydroxyl group-containing polymerizable unsaturated monomer is a compound having one or more hydroxyl and polymerizable unsaturated bonds in the molecule. Examples for the hydroxyl group-containing polymerizable unsaturated monomer include the examples of the "monomer (xi)" for the aqueous dispersion of an acryl-modified polyester resin (A), and any desired combinations thereof.

Examples for the other polymerizable unsaturated monomer that is copolymerizable with the hydroxyl group-containing polymerizable unsaturated monomer include the examples of "monomers (i) to (x) and (xii) to (xx)" for the aqueous dispersion of an acryl-modified polyester resin (A), and any desired combinations thereof.

The aqueous dispersion of hydroxyl group-containing acrylic-based polymer fine particles ($C_1$) contains, as a constituent component, the aforementioned hydroxyl group-containing polymerizable unsaturated monomer at preferably about 0.5 to about 50 mass %, more preferably about 1.0 to about 40 mass % and even more preferably about 1.5 to about 30 mass %, based on the total mass of the monomer component.

The hydroxyl group-containing acrylic-based polymer fine particles composing the aqueous dispersion of hydroxyl group-containing acrylic-based polymer fine particles ($C_1$) has a hydroxyl value of preferably about 1 to about 200 mgKOH/g, more preferably about 5 to about 150 mgKOH/g and even more preferably about 10 to about 100 mgKOH/g, from the viewpoint of water resistance of the coating film that is to be formed.

The hydroxyl group-containing acrylic-based polymer fine particles may also have an acid value, from the viewpoint of storage stability of the coating material and smoothness, distinctness of image and water resistance of the coating film that is to be formed. In such a case, the hydroxyl group-containing acrylic-based polymer fine particles have an acid value of preferably about 0.1 to about 55 mgKOH/g, more preferably about 3 to about 50 mgKOH/g and even more preferably about 7 to about 45 mgKOH/g.

Also, from the viewpoint of smoothness, distinctness of image, adhesion and water resistance of the multilayer coating film that is to be formed, the aqueous dispersion of hydroxyl group-containing acrylic-based polymer fine particles ($C_1$) is preferably a core-shell type.

The aqueous dispersion of core-shell type hydroxyl group-containing acrylic-based polymer fine particles is preferably an aqueous dispersion of core-shell type hydroxyl group-containing acrylic-based polymer fine particles ($C_{11}$) wherein the core section is copolymer (I) (hereunder also referred to as "core section copolymer (I)") and the shell section is copolymer (II) (hereunder also referred to as "shell section copolymer (II)").

The core section copolymer (I) includes, as copolymerizing components, a polymerizable unsaturated monomer ($I_1$) having two or more polymerizable unsaturated groups in the molecule (hereunder also referred to as "monomer ($I_1$)"), and a polymerizable unsaturated monomer ($I_2$) having one polymerizable unsaturated group in the molecule (hereunder also referred to as "monomer ($I_2$)"). Also, the shell section copolymer (II) includes a hydroxyl group-containing polymerizable unsaturated monomer ($II_1$), a carboxyl group-containing polymerizable unsaturated monomer ($II_2$) and another polymerizable unsaturated monomer (IL), as copolymerizing components.

Examples for the polymerizable unsaturated monomer ($I_1$) with two or more polymerizable unsaturated groups in the molecule, which is to form the core section copolymer (I), include allyl (meth)acrylate, ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra(meth)acrylate, glycerol di(meth)acrylate, 1,1,1-trishydroxymethylethane di(meth)acrylate, 1,1,1-trishydroxymethylethane tri(meth)acrylate, 1,1,1-trishydroxymethylpropane tri(meth)acrylate, triallyl isocyanurate, diallyl terephthalate, divinylbenzene, methylenebis(meth)acrylamide, ethylenebis(meth)acrylamide, and any combinations thereof.

The polymerizable unsaturated monomer ($I_1$) with two or more polymerizable unsaturated groups in the molecule has the function of imparting a crosslinked structure to the core section copolymer (I), and it may be included as appropriate for the desired crosslinking degree of the core section copolymer (I). The core section copolymer (I) contains the polymerizable unsaturated monomer ($I_1$) with two or more polymerizable unsaturated groups in the molecule in the range of preferably about 0.05 to about 20 mass %, more preferably about 0.1 to about 10 mass % and even more preferably about 0.2 to about 7 mass %, as a copolymerizing component, based on the total mass of the copolymerizing components composing the core section copolymer (I).

The polymerizable unsaturated monomer ($I_2$) with one polymerizable unsaturated group in the molecule, that is to form the core section copolymer (I), is a polymerizable unsaturated monomer that is copolymerizable with the polymerizable unsaturated monomer ($I_1$) with two or more polymerizable unsaturated groups in the molecule.

Specific examples for the polymerizable unsaturated monomer ($I_2$) with one polymerizable unsaturated group in the molecule, among the polymerizable unsaturated monomers mentioned as examples of hydroxyl group-containing polymerizable unsaturated monomers and other polymerizable unsaturated monomers that are copolymerizable with hydroxyl group-containing polymerizable unsaturated monomers, listed in describing the aqueous dispersion of an acryl-modified polyester resin (A), include monomers such as (i) to (xii) and (xiv) to (xx) which are polymerizable unsaturated monomers other than the polymerizable unsaturated monomer with two or more polymerizable unsaturated groups in the molecule, as well as any combinations thereof.

From the viewpoint of the smoothness and distinctness of image of the coating film that is to be formed, there is preferably included a hydrophobic polymerizable unsaturated monomer as at least one type of the polymerizable unsaturated monomer ($I_2$) with one polymerizable unsaturated group in the molecule.

Throughout the present specification, the hydrophobic polymerizable unsaturated monomer referred to is a polymerizable unsaturated monomer having a C4 or greater and preferably C6-C18 straight-chain, branched or cyclic saturated or unsaturated hydrocarbon group, excluding monomers having hydrophilic groups such as hydroxyl group-containing polymerizable unsaturated monomers.

Examples for the hydrophobic polymerizable unsaturated monomer include alkyl or cycloalkyl (meth)acrylates such as n-butyl (meth)acrylate, isobutyl (meth)acrylate, tert-butyl (meth)acrylate, pentyl (meth)acrylate, hexyl (meth)acrylate, octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl(meth)acrylate, tert-butylcyclohexyl(meth)acrylate, cyclododecyl (meth)acrylate and tricyclodecanyl (meth)acrylate; polymerizable unsaturated compounds with isobornyl groups such as isobornyl (meth)acrylate; polymerizable unsaturated compounds with adamantyl groups such as adamantly (meth)acrylate; aromatic ring-containing polymerizable unsaturated monomers such as benzyl (meth)acrylate, styrene, α-methylstyrene and vinyltoluene, and any combinations thereof.

From the viewpoint of distinctness of image, etc., of the multilayer coating film that is to be formed, the hydrophobic polymerizable unsaturated monomer is preferably at least one type of polymerizable unsaturated monomer selected from the group consisting of n-butyl (meth)acrylate, 2-ethylhexyl (meth)acrylate and styrene.

When the core section copolymer (I) contains the aforementioned hydrophobic polymerizable unsaturated monomer as a copolymerizing component, it contains the hydrophobic polymerizable unsaturated monomer as a copolymerizing component at preferably about 5 to about 90 mass %, more preferably about 20 to about 85 mass % and even more preferably about 40 to about 75 mass % based on the total mass of the copolymerizing component composing the core section copolymer (I). This is from the viewpoint of stability in the aqueous medium of the aqueous dispersion of core-shell type hydroxyl group-containing acrylic-based polymer fine particles ($C_{11}$) and the smoothness, distinctness of image and water resistance of the coating film that is to be obtained.

The shell section copolymer (II) comprises, as copolymerizing components, a hydroxyl group-containing polymerizable unsaturated monomer, an acid group-containing polymerizable unsaturated monomer and another polymerizable unsaturated monomer.

The hydroxyl group-containing polymerizable unsaturated monomer ($II_1$) which is to form the shell section copolymer (II) has the function of increasing the water resistance of the coating film by introducing hydroxyl groups, that undergo crosslinking reaction with the blocked polyisocyanate compound (B), into the aqueous dispersion of core-shell type hydroxyl group-containing acrylic-based polymer fine particles ($C_{11}$) that is to be obtained, as well as improving the stability of the aqueous dispersion of core-shell type hydroxyl group-containing acrylic-based polymer fine particles ($C_{11}$) in the aqueous medium.

Examples for the hydroxyl group-containing polymerizable unsaturated monomer ($II_1$) include monoesters of (meth)acrylic acid and approximately C2-C8 dihydric alcohols, such as 2-hydroxyethyl (meth)acrylate, 2-hydroxypropyl (meth)acrylate, 3-hydroxypropyl (meth)acrylate and 4-hydroxybutyl (meth)acrylate; ε-caprolactone-modified forms of monoesters of the (meth)acrylic acid and approximately C2-C8 dihydric alcohols; N-hydroxymethyl (meth)acrylamide; allyl alcohols, and (meth)acrylates having polyoxyethylene chains with hydroxyl group molecular ends, as well as any combinations thereof.

The hydroxyl group-containing polymerizable unsaturated monomer ($II_1$) is preferably selected from the group consisting of 2-hydroxyethyl (meth)acrylate, 2-hydroxypropyl (meth)acrylate, 3-hydroxypropyl (meth)acrylate and 4-hydroxybutyl (meth)acrylate, as well as any combinations thereof, and more preferably it is 2-hydroxyethyl (meth)acrylate.

The shell section copolymer (II) contains the hydroxyl group-containing polymerizable unsaturated monomer ($II_1$) as a copolymerizing component in the range of preferably about 1 to about 40 mass %, more preferably about 4 to about 25 mass % and even more preferably about 7 to about 19 mass %, based on the total mass of the copolymerizing components that are to compose the shell section copolymer (II). This is from the viewpoint of stability in the aqueous medium of the aqueous dispersion of core-shell type hydroxyl group-containing acrylic-based polymer fine particles ($C_{11}$) and the water resistance of the coating film that is to be obtained.

The carboxyl group-containing polymerizable unsaturated monomer ($II_2$) that is to compose the shell section copolymer (II) may be a carboxyl group-containing polymerizable unsaturated monomer (x), as mentioned for the aqueous dispersion of an acryl-modified polyester resin (A). The carboxyl group-containing polymerizable unsaturated monomer ($II_2$) is preferably acrylic acid and/or methacrylic acid. If the shell section contains a carboxyl group-containing polymerizable unsaturated monomer ($II_2$) as a copolymerizing component, stability of the obtained aqueous dispersion of core-shell type hydroxyl group-containing acrylic-based polymer fine particles ($C_{11}$) in the aqueous medium will be ensured.

The shell section copolymer (II) contains the carboxyl group-containing polymerizable unsaturated monomer ($II_2$) as a copolymerizing component, at preferably about 0.1 to about 30 mass %, more preferably about 2 to about 25 mass % and even more preferably about 3 to about 19 mass %, based on the total mass of the copolymerizing components that are to compose the shell section copolymer (II). This is from the viewpoint of stability in the aqueous medium of the aqueous dispersion of core-shell type hydroxyl group-containing acrylic-based polymer fine particles ($C_{11}$) and the water resistance of the coating film that is to be obtained.

The other polymerizable unsaturated monomer ($II_3$) that is to form the shell section copolymer (II) is a polymerizable unsaturated monomer other than the hydroxyl group-containing polymerizable unsaturated monomer ($II_1$) and carboxyl group-containing polymerizable unsaturated monomer ($II_2$). Examples for the other polymerizable unsaturated monomer ($II_3$) include alkyl or cycloalkyl (meth)acrylates such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, pentyl (meth)acrylate, hexyl (meth)acrylate, octyl (meth)acrylate, 2-ethylhexyl (meth)acrylate, nonyl (meth)acrylate, dodecyl (meth)acrylate, tridecyl (meth)acrylate, stearyl (meth)acrylate, isostearyl (meth)acrylate, cyclohexyl (meth)acrylate, methylcyclohexyl (meth)acrylate, tert-butylcyclohexyl (meth)acrylate, cyclododecyl (meth)acrylate and tricyclodecanyl (meth)acrylate; polymerizable unsaturated compounds with isobornyl groups such as isobornyl (meth)acrylate; polymerizable unsaturated compounds with adamantyl groups such as adamantyl (meth)acrylate; aromatic ring-containing polymerizable unsaturated monomers such as benzyl (meth)acrylate, styrene, α-methylstyrene and vinyltoluene, and any combinations thereof.

Preferred as the other polymerizable unsaturated monomer ($II_3$) that is to form the shell section copolymer (II) is one that includes no polymerizable unsaturated monomer with two or more polymerizable unsaturated groups in the molecule as a copolymerizing component, but one wherein the shell section copolymer (II) is non-crosslinked, from the viewpoint of improving the brightness of the coating film that is to be obtained.

The core section copolymer (I)/shell section copolymer (II)) proportion in the aqueous dispersion of core-shell type hydroxyl group-containing acrylic-based polymer fine particles ($C_{11}$) is preferably about 5/95 to about 95/5, more preferably about 50/50 to about 85/15 and even more preferably about 60/40 to about 80/20, as the solid mass ratio, from the viewpoint of improving the distinctness of image and brightness of the coating film that is to be formed.

The aqueous dispersion of core-shell type hydroxyl group-containing acrylic-based polymer fine particles ($C_{11}$) has a hydroxyl value of preferably about 1 to about 200 mgKOH/g, more preferably about 5 to about 150 mgKOH/g and even more preferably about 10 to about 100 mgKOH/g, from the viewpoint of improving the chipping resistance and water resistance of the coating film that is to be obtained.

The aqueous dispersion of core-shell type hydroxyl group-containing acrylic-based polymer fine particles ($C_{11}$) may also have an acid value, from the viewpoint of storage stability of the coating material and smoothness, distinctness of image and water resistance of the coating film that is to be formed. In that case, the aqueous dispersion of core-shell type hydroxyl group-containing acrylic-based polymer fine particles ($C_{11}$) has an acid value of preferably about 0.1 to about 55 mgKOH/g, more preferably about 3 to about 50 mgKOH/g and even more preferably about 7 to about 45 mgKOH/g.

The aqueous dispersion of core-shell type hydroxyl group-containing acrylic-based polymer fine particles ($C_{11}$) can be obtained, for example, by emulsion polymerization of a monomer mixture comprising about 0 to about 20 mass % of a polymerizable unsaturated monomer ($I_1$) with two or more polymerizable unsaturated groups in the molecule and about 80 to about 100 mass % of a polymerizable unsaturated monomer ($I_2$) with one polymerizable unsaturated group in the molecule, to obtain an emulsion of a core section copolymer (I), and then adding to the emulsion a monomer mixture comprising about 1 to about 40 mass % of a hydroxyl group-containing polymerizable unsaturated monomer ($II_1$), about 0.1 to about 30 mass % of a carboxyl group-containing polymerizable unsaturated monomer ($II_2$) and about 30 to about 98.9 mass % of another polymerizable unsaturated monomer ($II_3$), and further conducting emulsion polymerization to form a shell section copolymer (II).

The emulsion polymerization used to prepare an emulsion of the core section copolymer (I) may be carried out by a known method. For example, the emulsion polymerization can be carried out by adding a polymerization initiator to a mixture of the aforementioned monomers in the presence of a surfactant.

Surfactants include anionic surfactants and nonionic surfactants. Examples of anionic surfactants include sodium salts and ammonium salts of alkylsulfonic acids, alkylbenzenesulfonic acids and alkylphosphoric acids. Examples for the nonionic surfactant include polyoxyethylene oleyl ether, polyoxyethylene stearyl ether, polyoxyethylene lauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan trioleate and polyoxyethylenesorbitan monolaurate.

Also, the anionic surfactant may be a polyoxyalkylene group-containing anionic surfactant having an anionic group and a polyoxyalkylene group such as polyoxyethylene or polyoxypropylene in the molecule; or a reactive anionic surfactant having an anionic group and a radical polymerizable unsaturated group in the molecule, with reactive anionic surfactants being preferred.

The reactive anionic surfactant may be a sodium salt or ammonium salt of a sulfonic acid compound having a radical polymerizable unsaturated group such as allyl, methallyl, (meth)acryloyl, propenyl or butenyl, with ammonium salts of sulfonic acid compounds having radical polymerizable unsaturated groups being preferred for excellent water resistance of the coating film that is to be obtained. An example of a commercial ammonium salt of a sulfonic acid compound is "LATEMUL S-180A" (trade name of Kao Corp.).

Among ammonium salts of sulfonic acid compounds with radical polymerizable unsaturated groups, there are preferred ammonium salts of sulfonic acid compounds having radical polymerizable unsaturated groups and polyoxyalkylene groups. Examples of commercial products of ammonium salts of sulfonic acid compounds with radical polymerizable unsaturated groups and polyoxyalkylene groups include "AQUALON KH-10" (trade name of Dai-ichi Kogyo Seiyaku Co., Ltd.), "LATEMUL PD-104" (trade name of Kao Corp.) and "ADEKA REASOAP SR-1025" (trade name of Adeka Corp.).

The emulsion polymerization is carried out by adding the surfactant to the reaction system, preferably at about 0.1 to about 15 mass %, more preferably at about 0.5 to about 10 mass % and even more preferably at about 1 to about 5 mass %, based on the total mass of all of the monomers.

Examples for the polymerization initiator include organic peroxides such as benzoyl peroxide, octanoyl peroxide, lauroyl peroxide, stearoyl peroxide, cumene hydroperoxide, tert-butyl peroxide, di-tert-amyl peroxide, tert-butylperoxy-2-ethyl hexanoate, tert-butyl peroxylaurate, tert-butylperoxyisopropyl carbonate, tert-butyl peroxyacetate and diisopropylbenzene hydroperoxide; azo compounds such as azobisisobutyronitrile, azobis(2,4-dimethylvaleronitrile), azobis(2-methylpropionitrile), azobis(2-methylbutyronitrile), 4,4'-azobis(4-cyanobutanoic acid), dimethylazobis(2-methyl propionate), azobis[2-methyl-N-(2-hydroxyethyl)-propionamide] and azobis{2-methyl-N-[2-(1-hydroxybutyl)]-propionamide}; persulfuric acid salts such as potassium persulfate, ammonium persulfate and sodium persulfate, and any combinations thereof. If desired, a reducing agent such as a sugar, sodium formaldehyde sulfoxylate or an iron complex may be used with the polymerization initiator, for use as a redox initiator.

The emulsion polymerization is carried out by adding the polymerization initiator to the reaction system, preferably at about 0.1 to about 5 mass % and more preferably at about 0.2 to about 3 mass %, based on the total mass of all of the monomers. The polymerization initiator may be added according to its type and amount, without any particular restrictions. For example, the polymerization initiator may be added beforehand to the monomer mixture or aqueous medium, or the polymerization initiator may be added directly to the reaction system all at once during polymerization, or in a dropwise manner.

The aqueous dispersion of core-shell type hydroxyl group-containing acrylic-based polymer fine particles ($C_{11}$) is obtained, for example, by adding a monomer mixture comprising a hydroxyl group-containing polymerizable unsaturated monomer ($II_1$), a carboxyl group-containing polymerizable unsaturated monomer ($II_2$) and another polymerizable unsaturated monomer ($II_3$) to an emulsion of the core section copolymer (I), and conducting further polymerization to form the shell section copolymer (II).

The monomer mixture that is to form the shell section copolymer (II) may appropriately include components such as polymerization initiators, chain transfer agents, reducing agents, surfactants and the like as desired. Also, although the monomer mixture may be added dropwise as is, preferably it is added dropwise as a monomer emulsion obtained by dispersing the monomer mixture in an aqueous medium. The particle diameter of the monomer emulsion is not particularly restricted.

The monomer mixture that is to form the shell section copolymer (II) is formed, for example, by adding the monomer mixture or its emulsion to the reaction system either all at once or in a slow dropwise fashion, and heating to a suitable temperature while stirring, as a method for forming the shell section copolymer (II) around the core section copolymer (I). The aqueous dispersion of core-shell type hydroxyl group-containing acrylic-based polymer fine particles ($C_{11}$) obtained in this manner has a multilayer structure with a core section of a copolymer (I) of a polymerizable unsaturated monomer ($I_1$) with two or more polymerizable unsaturated groups in the molecule and a polymerizable unsaturated monomer ($I_2$) with one polymerizable unsaturated group in the molecule, and a shell section of a copolymer (II) of a hydroxyl group-containing polymerizable unsaturated monomer ($II_1$), a carboxyl group-containing polymerizable unsaturated monomer ($II_2$) and another polymerizable unsaturated monomer ($II_3$)).

Also, the aqueous dispersion of core-shell type hydroxyl group-containing acrylic-based polymer fine particles ($C_{11}$) may, for example, comprise 3 or more layers, by adding a step of supplying a polymerizable unsaturated monomer (a single monomer or a mixture of two or more monomers) that is to form another resin layer for emulsion polymerization, between the step of obtaining the core section copolymer (I) and the step of obtaining the shell section copolymer (II)).

According to the invention, "shell section" of the aqueous dispersion of core-shell type hydroxyl group-containing acrylic-based polymer fine particles ($C_{11}$) means the polymer layer present on the outermost layer of the resin particles, "core section" means the polymer layer of the inner layer of the resin particles excluding the shell section, and "core-shell type structure" means the structure comprising the core section and the shell section.

The core-shell type structure is usually a layered structure with the core section totally covered by the shell section, but depending on the mass ratio of the core section and shell section, the amount of monomer of the shell section may be insufficient to form a layered structure. In such cases, it is not necessary for it to be a completely layered structure as described above, but instead it may be a structure wherein a portion of the core section is covered by the shell section. The concept of a multilayer structure in the core-shell type structure likewise applies when a multilayer structure is to be formed on the core section in the aqueous dispersion of core-shell type hydroxyl group-containing acrylic-based polymer fine particles ($C_{11}$).

The aqueous dispersion of core-shell type hydroxyl group-containing acrylic-based polymer fine particles ($C_{11}$) has a mean particle diameter in the range of generally about 10 to about 1,000 nm, preferably about 30 to about 500 nm and more preferably about 50 to about 200 nm.

The mean particle diameter in the aqueous dispersion of core-shell type hydroxyl group-containing acrylic-based polymer fine particles ($C_{11}$) referred to throughout the present specification is the value measured using a submicron particle size distribution analyzer at 20° C., after dilution with deionized water by a common method. As an example of a submicron particle size distribution analyzer, there may be used a "COULTER N4" (trade name of Beckman Coulter, Inc.).

In order to improve the mechanical stability of the core-shell type hydroxyl group-containing acrylic-based polymer fine particles, the acidic groups such as carboxyl groups of the core-shell type hydroxyl group-containing acrylic-based polymer fine particles are preferably neutralized with a neutralizing agent. There are no particular restrictions on the neutralizing agent so long as it can neutralize the acidic groups, and examples include sodium hydroxide, potassium hydroxide, trimethylamine, 2-(dimethylamino)ethanol, 2-(diethylamino)ethanol, 2-(dibutylamino)ethanol, 2-amino-2-methyl-1-propanol, triethylamine, tributylamine and ammonia water, as well as any combinations thereof. The neutralizing agent is preferably used in an amount such that the pH of the aqueous dispersion of core-shell type hydroxyl group-containing acrylic-based polymer fine particles ($C_{11}$) after neutralization is between about 6.5 and about 9.0.

[Aqueous Coating Composition]

The aqueous coating composition of the invention is an aqueous coating composition comprising an aqueous dispersion of an acryl-modified polyester resin (A), a blocked polyisocyanate compound having a nonionic hydrophilic group (B) and an aqueous dispersion of acrylic-based polymer fine particles (C).

The aqueous dispersion of an acryl-modified polyester resin (A), the blocked polyisocyanate compound having a nonionic hydrophilic group (B) and the aqueous dispersion of acrylic-based polymer fine particles (C) in the aqueous coating composition of the invention may have the following ranges based on 100 parts by mass of the resin solid content in the aqueous coating composition, from the viewpoint of the smoothness, distinctness of image and water resistance of the coating film that is to be formed.

Aqueous dispersion of acryl-modified polyester resin (A):
Preferably about 10 to about 70 parts, more preferably about 15 to about 60 parts and even more preferably about 20 to about 55 parts.

Blocked polyisocyanate compound having nonionic hydrophilic group (B):
Preferably about 1 to about 30 parts, more preferably about 2 to about 20 parts and even more preferably about 3 to about 15 parts.

Aqueous dispersion of acrylic-based polymer fine particles (C):
Preferably about 10 to about 60 parts, more preferably about 20 to about 50 parts and even more preferably about 25 to about 45 parts.

Also, the aqueous coating composition may further contain a curing agent other than the blocked polyisocyanate compound (B). Publicly known curing agents may be mentioned as curing agents, with amino resins being particularly preferred.

The amino resin may be a partial methylolated amino resin or total methylolated amino resin, obtained by reacting an amino component and an aldehyde component. Examples of such amino components include melamine, urea, benzoguanamine, acetoguanamine, steroguanamine, spiroguanamine and dicyandiamide. Examples of aldehyde components include formaldehyde, paraformaldehyde, acetaldehyde and benzaldehyde.

Also, the methylol groups in the methylolated amino resin may be partially or completely etherified with an alcohol. Examples of alcohols to be used for the etherification include methyl alcohol, ethyl alcohol, n-propyl alcohol, isopropyl alcohol, n-butyl alcohol, isobutyl alcohol, 2-ethylbutanol and 2-ethylhexanol.

The amino resin is preferably a melamine resin (D). Most preferably it is a methyl etherified melamine resin wherein the methylol groups of a partially or totally methylolated melamine resin are partially or totally etherified with methyl alcohol, a butyl etherified melamine resin wherein the methylol groups of a partially or totally methylolated melamine resin are partially or totally etherified with butyl alcohol, or a methyl-butyl mixed etherified melamine resin wherein the methylol groups of a partially or totally methylolated melamine resin are partially or totally etherified with methyl alcohol and butyl alcohol.

Also, from the viewpoint of the water resistance of the coating film that is to be obtained, the melamine resin (D) has a weight-average molecular weight of preferably about 400 to about 6,000, more preferably about 500 to about 4,000 and even more preferably about 600 to about 3,000.

Examples of melamine resins (D) include the trade names "SAIMEL 202", "SAIMEL 203", "SAIMEL 238", "SAIMEL 251", "SAIMEL 303", "SAIMEL 323", "SAIMEL 324", "SAIMEL 325", "SAIMEL 327", "SAIMEL 350", "SAIMEL 385", "SAIMEL 1156", "SAIMEL 1158", "SAIMEL 1116" and "SAIMEL 1130" (all products of Nihon Cytec Industries Inc.), and "U-VAN 120", "U-VAN 20HS", "U-VAN 20SE60", "U-VAN 2021", "U-VAN 2028" and "U-VAN 28-60" (all products of Mitsui Chemicals, Inc.).

When the aqueous coating composition of the invention includes a melamine resin (D), the aqueous coating composition contains the melamine resin (D) in the range of usually about 1 to about 50 parts by mass, preferably about 5 to about 40 parts by mass and more preferably about 7 to about 30 parts by mass, based on 100 parts by mass of the resin solid content in the aqueous coating composition.

The aqueous coating composition of the invention may further contain a polyurethane resin. The polyurethane resin may be a hydroxyl group-containing polyurethane resin. Examples for the hydroxyl group-containing polyurethane resin include reaction products of diisocyanate compounds selected from the group consisting of aliphatic diisocyanate compounds, alicyclic diisocyanate compounds and aromatic diisocyanate compounds, and any desired combinations thereof, and polyol compounds selected from the group consisting of polyether polyols, polyester polyols and polycarbonate polyols, and any desired combinations thereof.

Specific examples include products of reacting a diisocyanate selected from the group consisting of aliphatic diisocyanates and alicyclic diisocyanates, as well as their combinations, a diol selected from the group consisting of polyether diols, polyester diols and polycarbonate diols, as well as any combinations thereof, a low-molecular-weight polyhydroxy compound and a dimethylolalkanoic acid to produce a urethane prepolymer, neutralizing the urethane prepolymer with a tertiary amine, forming an emulsified dispersion of the neutralized urethane prepolymer in water, and if desired mixing it with an aqueous medium containing a chain extender such as a polyamine, a crosslinking agent or a terminator, and reacting until the isocyanate groups are essentially consumed. This method can yield a self-emulsifiable polyurethane resin having a mean particle diameter of usually about 0.001 to about 3 µm.

When the aqueous coating composition of the invention includes a hydroxyl group-containing urethane resin, the aqueous coating composition contains the hydroxyl group-containing urethane resin in the range of usually about 1 to about 50 parts by mass, preferably about 5 to about 40 parts by mass and more preferably about 7 to about 30 parts by mass, based on 100 parts by mass of the resin solid content in the aqueous coating composition.

The aqueous coating composition of the invention also preferably further contains a pigment. Examples for the pigment include color pigments, extender pigments and luster pigments, as well as any combinations thereof. The aqueous coating composition of the invention preferably contains either or both a color pigment and a luster pigment.

Examples for the color pigment include titanium oxide, zinc oxide, carbon black, molybdenum red, Prussian blue, cobalt blue, azo-based pigments, phthalocyanine-based pigments, quinacridone-based pigments, isoindoline-based pigments, threne-based pigments, perylene-based pigments, dioxazine-based pigments, diketopyrrolopyrrole-based pigments and the like.

When the aqueous coating composition of the invention includes the aforementioned color pigment, the aqueous coating composition contains the color pigment in the range of usually about 1 to about 150 parts by mass, preferably about 3 to about 130 parts by mass and more preferably about 5 to about 110 parts by mass, based on 100 parts by mass of the resin solid content in the aqueous coating composition.

Examples for the luster pigment include aluminum (including vapor deposited aluminum), copper, zinc, brass, nickel, aluminum oxide, mica, aluminum oxide covered by titanium oxide or iron oxide, mica covered by titanium oxide or iron oxide, glass flakes, hologram pigments and the like, as well as any combinations thereof.

The luster pigment is preferably aluminum, aluminum oxide, mica, aluminum oxide covered by titanium oxide or iron oxide or mica covered by and titanium oxide or iron oxide, and is more preferably aluminum. These examples of aluminum are non-leafing-type aluminum and leafing-type aluminum.

When the aqueous coating composition of the invention includes the aforementioned luster pigment, the aqueous coating composition contains the luster pigment in the range of usually about 1 to about 50 parts by mass, preferably about 2 to about 30 parts by mass and more preferably about 3 to about 20 parts by mass, based on 100 parts by mass of the resin solid content in the aqueous coating composition.

The aqueous coating composition of the invention preferably further contains a hydrophobic solvent from the viewpoint of improved smoothness, distinctness of image and pinhole popping resistance of the coating film that is to be formed.

The hydrophobic solvent has a solubility of preferably no greater than about 10 g, more preferably no greater than about 5 g and even more preferably no greater than about 1 g, in 100 g of water at 20° C.

Examples for the hydrophobic solvent include hydrocarbon-based solvents such as rubber volatile oils, mineral spirits, toluene, xylene and solvent naphtha; alcohol-based solvents such as 1-hexanol, 1-octanol, 2-octanol, 2-ethyl-1-hexanol, 1-decanol, benzyl alcohol, ethyleneglycol mono-2-ethylhexyl ether, propyleneglycol mono-n-butyl ether, dipropyleneglycol mono-n-butyl ether, tripropyleneglycol mono-n-butyl ether, propyleneglycol mono-2-ethylhexyl ether and propyleneglycol monophenyl ether; ester-based solvents such as n-butyl acetate, isobutyl acetate, isoamyl acetate, methylamyl acetate and ethylene glycol monobutyl acetate ether; ketone-based solvents such as methyl isobutyl ketone, cyclohexanone, ethyl-n-amyl ketone and diisobutyl ketone; and any combinations thereof.

When the aqueous coating composition of the invention includes a hydrophobic solvent, the aqueous coating composition contains the hydrophobic solvent in the range of usually about 2 to about 100 parts by mass, preferably about 5 to about 80 parts by mass and more preferably about 8 to about 60 parts by mass, based on 100 parts by mass of the resin solid content in the aqueous coating composition.

Also, the aqueous coating composition of the invention may further contain, optionally, paint additives such as thickening agents, curing catalysts, ultraviolet absorbers, light stabilizers, antifoaming agents, plasticizers, organic solvents other than the aforementioned hydrophobic solvents, surface control agents, anti-settling agents and the like.

Examples for the thickening agent include inorganic thickening agents such as silicates, metal silicates, montmorillonite and colloidal alumina; polyacrylic acid-based thickening agents such as copolymers of (meth)acrylic acids and (meth)acrylic acid esters and sodium polyacrylate; associative thickening agents having a hydrophilic portion and a hydrophobic portion in the molecule and exhibiting an effective thickening effect when the hydrophobic portion is adsorbed onto the pigment in the coating material or the emulsion particle surfaces in aqueous medium, such that the hydrophobic portions become associated together; cellulosic derivative-based thickening agents such as carboxymethyl cellulose, methyl cellulose and hydroxyethyl cellulose; protein-based thickening agents such as casein, sodium caseinate and ammonium caseinate; alginic acid-based thickening agents such as sodium alginate; polyvinyl-based thickening agents such as polyvinyl alcohol, polyvinylpyrrolidone and polyvinylbenzyl ether copolymer; polyether-based thickening agents such as Pluronic polyethers, polyether dialkyl esters, polyether dialkyl ethers and polyether epoxy-modified compounds; maleic anhydride copolymer-based thickening agents such as partial esters of vinyl methyl ether-maleic anhydride copolymers; and polyamide-based thickening agents such as polyamide amine salts, as well as any combinations thereof.

The aforementioned polyacrylic acid-based thickening agents are commercially available, and examples include "ACRYSOL ASE-60", "ACRYSOL TT-615" and "ACRYSOL RM-5" (all trade names) by Rohm & Haas, and "SN THICKENER 613", "SN THICKENER 618", "SN THICKENER 630", "SN THICKENER 634" and "SN THICKENER 636" (all trade names) by San Nopco, Ltd.

The aforementioned associative thickening agents are also commercially available, and examples include "UH-420", "UH-450", "UH-462", "UH-472", "UH-540", "UH-752", "UH-756 VF" and "UH-814N" (all trade names) by Adeka Corp., "ACRYSOL RM-8W", "ACRYSOL RM-825", "ACRYSOL RM-2020NPR", "ACRYSOL RM-12W" and "ACRYSOL SCT-275" (all trade names) by Rohm & Haas, and "SN THICKENER 612", "SN THICKENER 621N", "SN THICKENER 625N", "SN THICKENER 627N" and "SN THICKENER 660T" (all trade names) by San Nopco, Ltd. The polyamide-based thickening agent may be "AQ-630" or "AQ-870" (both trade names) by Kusumoto Chemicals, Ltd.

When the aqueous coating composition of the invention includes the aforementioned thickening agent, the aqueous coating composition contains the thickening agent in the range of usually about 0.01 to about 15 parts by mass, preferably about 0.05 to about 10 parts by mass and more preferably about 0.1 to about 5 parts by mass, based on 100 parts by mass of the resin solid content in the aqueous coating composition.

[Preparation of Aqueous Coating Composition]

The aqueous coating composition of the invention can be prepared by mixing and/or dispersing an aqueous dispersion of an acryl-modified polyester resin (A), a blocked polyisocyanate compound having a nonionic hydrophilic group (B) and an aqueous dispersion of acrylic-based polymer fine particles (C), as well as optionally a curing agent other than the blocked polyisocyanate compound (B), a polyurethane resin, a pigment, a hydrophobic solvent and other paint additives, by a known method. Also, the aqueous medium may be deionized water or a mixture of deionized water and a hydrophilic organic solvent.

Examples of hydrophilic organic solvents include ethyleneglycol monobutyl ether, propyleneglycol monomethyl ether and propyleneglycol monopropyl ether.

The aqueous coating composition of the invention has a solid concentration in the range of generally about 10 to about 60 mass %, preferably about 15 to about 50 mass % and more preferably about 20 to about 40 mass %.

As used herein, the "solid content" of the coating material, resin and other components refers to the non-volatile components remaining after drying at 110° C. for 1 hour. For example, the solid content of the coating material consists of the non-volatile components of the base resin, curing agent, pigment, etc. remaining in the coating material after drying at 110° C. for 1 hour. Thus, the solid concentration of the coating material can be calculated by measuring the coating material in a heat-proof container such as an aluminum foil cup, spreading the coating material on the bottom of the container and then drying at 110° C. for 1 hour, and measuring the mass of the coating material components remaining after drying to determine the ratio of the mass of the coating material components remaining after drying with respect to the total mass of the coating material before drying.

[Method for Producing Coated Article]

The aqueous coating composition of the invention can be coated onto various types of articles to be coated, allowing formation of coating films with excellent smoothness, distinctness of image, adhesion and water resistance. The aqueous coating composition of the invention can form a multilayer coating film with excellent smoothness, distinctness of image, adhesion and water resistance, and is therefore preferably used as an aqueous coating material for a base coating film or top coating film in a method for producing a coated article in which the aqueous coating material is recoated.

While the reason for the excellent smoothness, distinctness of image, adhesion and water resistance of the multilayer coating film is not fully understood, it is conjectured to be as follows.

It is conjectured that the aqueous coating composition of the invention forms a coating film with excellent water resistance by the acryl-modified polyester resin ($a_1$) in the aqueous dispersion of an acryl-modified polyester resin (A).

On the other hand, because the blocked polyisocyanate compound (B) has a nonionic hydrophilic group, it exists relatively stably in the aqueous coating material compared to conventional blocked isocyanate compounds. As a result, the aqueous coating composition of the invention can improve problems such as low smoothness, low distinctness of image, and low adhesion and water resistance due to insufficient curing, which have conventionally been problems.

It is further conjectured that since the aqueous dispersion of acrylic-based polymer fine particles (C) can impart suitable rheology properties to the coating film, it is possible to obtain a multilayer coating film having minimal mixing of the layers in the multilayer coating film, and having excellent smoothness and distinctness of image.

When the blocked polyisocyanate compound (B) has a hydrocarbon group with a specific branched structure, the blocked polyisocyanate compound (B) has suitably reduced polarity, and therefore mixing of the layers in the multilayer coating film is minimal and smoothness and distinctness of image are further improved. Furthermore, it is conjectured that the suitably reduced polarity minimizes hydrolysis of the blocked isocyanate groups, increases storage stability and results in satisfactory adhesion after water resistance test after storage.

[Article to be Coated]

There are no particular restrictions on articles to be coated by application of the aqueous coating composition, and examples include external platings of automobile bodies of passenger vehicles, trucks, motorcycles and buses; automobile parts such as bumpers; and external platings of consumer electric products such as cellular phones or audio devices, among which external platings of automobile bodies and automobile parts are preferred.

The material of an article to be coated is not particularly restricted, and examples include metal materials such as iron, aluminum, brass, copper, tin, stainless steel, galvanized steel and alloyed zinc (such as Zn—Al, Zn—Ni and Zn—Fe)-plated steel and the like; resins such as polyethylene resins, polypropylene resins, acrylonitrile-butadiene-styrene (ABS) resins, polyamide resins, acrylic resins, vinylidene chloride resins, polycarbonate resins, polyurethane resins and epoxy resins, plastic materials such as various FRP materials; inorganic materials such as glass, cement and concrete; wood materials; fiber materials such as paper and fabrics, and the like, among which metal materials and plastic materials are preferred.

The article to be coated may be an article that is a metal material or has a metal surface such as that of a car body formed from the metal material, and that has been surface-treated by phosphate treatment, chromate treatment or complex oxide treatment, or that further has a coating film formed thereover.

The article to be coated on which the coating film has been formed may be one obtained by surface treating a base material as necessary and forming an undercoat film thereover, such as a car body having an undercoat film formed by electrodeposition coating.

The article to be coated may also be one that has been optionally surface treated on a plastic material, or on the plastic surface of an automobile part formed from a metal material mentioned above. The article to be coated may also be a combination of a plastic material and a metal material.

[Coating Method]

The coating method for the aqueous coating composition of the invention is not particularly restricted, and for example, it may be air spray coating, airless spray coating, rotary atomizing coating, curtain coating or the like, as such coating methods allow formation of wet coating films from aqueous coating compositions. Air spray coating and rotary atomizing coating are preferred for the coating method. Electrostatic printing may also be carried out as desired for coating of the aqueous coating composition of the invention.

The aqueous coating composition of the invention is coated so as to form a cured coating film with a thickness of preferably about 5 to about 70 μm, more preferably about 10 to about 50 μm and even more preferably about 20 to about 40 μm.

The wet coating film formed from the aqueous coating composition of the invention is cured by heating. The heating may be performed by known heating means, for example, a drying furnace such as an air heating furnace, electric furnace or infrared induction heating furnace. The heating is carried out at a temperature of preferably about 60° C. to about 160° C., more preferably about 70° C. to about 140° C. and even more preferably about 80° C. to about 120° C., for a period of preferably about 10 to about 60 minutes and more preferably about 20 to about 40 minutes.

The wet coating film formed from the aqueous coating composition of the invention is preferably subjected to preheating and air blowing under heating conditions in which the coating film essentially does not cure, after forming the wet coating film and before heating, from the viewpoint of preventing generation of coating defects such as pinhole popping. The preheating is carried out by heating at a temperature in a range of preferably about 40° C. to about 100° C., more preferably about 50° C. to about 90° C. and even more preferably about 60° C. to about 80° C., preferably for about 30 seconds to about 15 minutes, more preferably about 1 to about 10 minutes and even more preferably about 2 to about 5 minutes. Air blowing is normally carried out by blasting the coated surface of the article to be coated with heated air at a temperature of ordinary temperature or about 25° C. to about 80° C., for a period of about 30 seconds to about 15 minutes.

The aqueous coating composition of the invention may be used as a base coat material for a base coating film on an article to be coated such as an external plating of an automobile body, or an automobile part, by a method of forming a multilayer coating film comprising a primer coating film, a base coating film and a clear coating film by a 3-coat, 1-bake system.

The method may be carried out according to method I below, for example.

[Method I]

Method I includes the following steps 1-1 to 1-4.

Step 1-1: A step of coating an article to be coated with a primer coating, and forming an uncured primer coating film on the article to be coated.

Step 1-2: A step of coating the article to be coated having the uncured primer coating film, with an aqueous coating composition for a base coat, to form an uncured base coating film over it.

Step 1-3: A step of coating an article to be coated having the uncured primer coating film and the uncured base coating film, with a clear coating material to form an uncured clear coating film on it.

Step 1-4: A step of heating the uncured primer coating film, the uncured base coating film and the uncured clear coating film for curing.

Each of the steps will now be explained.

[Step 1-1]

Primer Coating

The primer coating may be a known intercoat material or primer for plastics. Specifically, the primer coating may appropriately contain, for example, a coating film-forming resin, crosslinking agent, color pigment, extender pigment, luster pigment and solvent, and optionally coating additives such as ultraviolet absorbers, light stabilizers, curing catalysts, plasticizers, adhesion promoters, compatibilizers, antifoaming agents, thickening agents, rust-preventive agents, surface control agents and conductive agents.

The coating film-forming resin may be, for example, an acrylic resin, polyester resin, alkyd resin, urethane resin, polyolefin resin or the like, or any desired combination thereof, and it preferably contains a hydroxyl group. The primer coating can be crosslinked by addition of a crosslinking agent, or it can be essentially non-crosslinked, without addition of a crosslinking agent. Alternatively, it may be a penetrating crosslinked type wherein crosslinking is accomplished by penetration of a crosslinking agent present in the upper layer coating film. Examples for the crosslinking agent include melamine resins, polyisocyanate compounds and blocked polyisocyanate compounds.

The primer coating composition may be either an organic solvent type or aqueous coating material type, with aqueous coating material types being preferred. The primer coating can be applied by a known method such as, for example, air spray coating, airless spray coating or rotary atomizing coating, and electrostatic application may also be applied during application. The primer coating will usually be coated to a cured film thickness of preferably about 3 to about 40 μm, more preferably about 5 to about 30 μm and even more preferably about 7 to about 20 μm.

The primer coating film may be subjected to preheating (predrying), air blowing and the like under heating conditions in which the coating film essentially does not cure, from the viewpoint of improving the smoothness and distinctness of image of the multilayer coating film that is to be formed and minimizing pinhole popping.

According to the invention, "cured coating film" means a coating film in a "cured dry state" as specified by JIS K 5600-1-1:1999, i.e. a state in which, when the center of the coating surface is firmly held between the thumb and the forefinger, no fingerprint indentation is formed on the coating surface, no movement of the coating film is felt, and no rubbing trace remains on the coating surface when the center of the coating surface is rapidly rubbed with the fingertips. Also as used herein, an "uncured coating film" is a state in which the coating film has not reached the cured dry state, and this also includes a "tack-free" state and "semi-cured dry state" as specified by JIS K 5600-1-1:1999.

By performing preheating, air blowing or the like, the solid concentration of the coating film is adjusted to be in the range of usually about 60 to about 100 mass %, preferably about 80 to about 100 mass % and more preferably about 90 to about 100 mass %.

As used herein, the solid concentration of a coating film is that measured by the following method. The solid concentration of an uncured primer coating film after preheating will be used for explanation.

When the article to be coated is coated with the primer coating, a primer coating may simultaneously be applied onto aluminum foil whose mass ($M_1$) has been previously measured. Next, after preheating the article to be coated with the uncured primer coating film and before coating with the next coating material, the aluminum foil is recovered and the mass ($M_2$) is measured. The recovered aluminum foil is then dried at 110° C. for 60 minutes and allowed to cool to room temperature (25° C.) in a desiccator, after which the mass ($M_3$) of the aluminum foil is measured and the solid concentration is calculated by the following formula.

Solid concentration(mass %)=$\{(M_3-M_1)/(M_2-M_1)\} \times 100$

This method allows calculation of the solid concentration of the primer coating film, base coating film and clear coating film at any desired time point.

The preheating is carried out by heating at a temperature in a range of preferably about 40° C. to about 100° C., more preferably about 50° C. to about 90° C. and even more preferably about 60° C. to about 80° C., preferably for about 30 seconds to about 15 minutes, more preferably about 1 to about 10 minutes and even more preferably about 2 to about 5 minutes. Air blowing may generally be carried out by blasting the coated surface of the article to be coated with heated air at a temperature of ordinary temperature (25° C.) or about 25° C. to about 80° C., for a period of about 30 seconds to about 15 minutes.

[Step 1-2]

In step 1-2, an aqueous coating composition is coated onto the uncured primer coating film as a base coat material, and an uncured base coating film is formed thereover. The aqueous coating composition may be the aforementioned aqueous coating composition.

The aqueous coating composition of the invention may be applied onto an article to be coated by a known method such as air spray coating, airless spray coating, rotary atomizing coating or curtain coating, with preferred methods being air spray coating and rotary atomizing coating. Electrostatic application may also be used during the coating.

From the viewpoint of preventing coating defects such as pinhole popping, the base coating film is preferably subjected to preheating (predrying), air blowing or the like under heating conditions in which the coating film essentially does not cure.

By performing preheating (predrying), air blowing or the like, the solid concentration of the base coating film is adjusted to be in the range of usually about 60 to about 100 mass %, preferably about 80 to about 100 mass % and more preferably about 90 to about 100 mass %.

The preheating is carried out by heating at a temperature in a range of preferably about 40° C. to about 100° C., more preferably about 50° C. to about 90° C. and even more preferably about 60° C. to about 80° C., preferably for about 30 seconds to about 15 minutes, more preferably about 1 to about 10 minutes and even more preferably about 2 to about 5 minutes. Air blowing may generally be carried out by blasting the coated surface of the article to be coated with heated air at a temperature of ordinary temperature or about 25° C. to about 80° C., for a period of about 30 seconds to about 15 minutes.

In Method I, the base coating film is coated so as to have a cured coating film in the range of usually about 3 to about 50 μm, preferably about 5 to about 35 μm and more preferably about 10 to about 20 μm.

[Step 1-3]

In step 1-3, an article to be coated having the uncured primer coating film and the uncured base coating film is coated with a clear coating material to form an uncured clear coating film on it.

The clear coating material may be a thermosetting clear coating material composition that is publicly known for coating of automobile bodies, automobile parts, household electrical appliances and the like, examples of which include organic solvent-type thermosetting coating materials, aqueous thermosetting coating materials, thermosetting powder coatings, thermosetting powder slurry coating materials and the like that contain a base resin with a crosslinkable functional group and a crosslinking agent, with organic solvent-type thermosetting coating materials being preferred.

Examples of crosslinkable functional groups in base resins include carboxyl, hydroxyl, epoxy, silanol, alkoxysilyl and reactive unsaturated groups.

Examples of base resins include acrylic resins, polyester resins, alkyd resins, urethane resins, epoxy resins and fluorine resins. Examples of crosslinking agents include polyisocyanate compounds, blocked polyisocyanate compounds, melamine resins, urea resins, carboxyl group-containing compounds, carboxyl group-containing resins, epoxy group-containing resins and epoxy group-containing compounds.

Examples of base resin and crosslinking agent combinations for the clear coating material include carboxyl group-containing resins and epoxy group-containing resins, hydroxyl group-containing resins and polyisocyanate compounds, hydroxyl group-containing resins and blocked polyisocyanate compounds and hydroxyl group-containing resins and melamine resin combinations.

Also, the clear coating material may be an one-pack type or multi-pack type, such as a two-pack urethane resin coating material, but when the clear coating material is to be heat cured at a temperature of about 70° C. or higher and below about 120° C., it is preferably a one-pack type urethane resin coating material containing the blocked polyisocyanate compound with a curing agent, or a two-pack urethane resin coating material containing the unblocked polyisocyanate compound as a curing agent.

Also, the clear coating material may contain, optionally, color pigments, luster pigments, dyes and the like in ranges that do not impair the transparency, and may further contain as appropriate, extender pigments, ultraviolet absorbers, light stabilizers, antifoaming agents, thickening agents, rust-preventive agents, surface control agents and the like.

The clear coating material can be applied onto the article to be coated having the uncured primer coating film and the uncured base coating film, by a known method such as air spray coating, airless spray coating or rotary atomizing coating, and an electrostatic charge may even be applied during the coating.

The clear coating material is applied to a cured film thickness in a range of usually about 10 to about 80 μm, preferably about 15 to about 60 μm and more preferably about 20 to about 50 μm.

Also, if desired, the uncured clear coating film may be allowed to stand at room temperature for about 1 to about 60 minutes, or preheated for about 1 to about 60 minutes at a temperature of about 40° C. to about 80° C.

[Step 1-4]

In step 1-4, the uncured primer coating film, the uncured base coating film and the uncured clear coating film are heated for curing.

The uncured primer coating film, the base coating film and the clear coating film can be cured by common coating film baking means, such as hot air heating, infrared heating or high-frequency heating.

From the viewpoint of energy efficiency and/or heat resistance of the base material, the heating is carried out at a temperature of preferably about 70° C. to about 120° C., more preferably about 70° C. to about 110° C. and even more preferably about 80° C. to about 100° C., for preferably about 10 to about 60 minutes and more preferably about 15 to about 40 minutes. By heating, it is possible to cure at once a multilayer coating film composed of three layers, a primer coating film, a base coating film and a clear coating film.

The aqueous coating composition of the invention may be used as a top coat material in a method of forming a coating film by application of a top coat material onto an article to be coated such as an automobile body or automobile part.

The method may be carried out according to method II below, for example.

[Method II]

Method II includes the following steps 2-1 and 2-2.

Step 2-1: A step of coating an article to be coated with an aqueous coating composition as the top coat material, to form a top coating film on the article to be coated.

Step 2-2: A step of heating the uncured top coating film for curing.

The article to be coated may have a primer coating film formed on it, and the primer coating film may be cured or uncured.

In step 2-1, following formation of the clear coating film it is allowed to stand at room temperature for an interval of about 1 to about 60 minutes, or it is preheated under heating conditions in which the clear coating film essentially does not cure (for example, a temperature of about 40° C. to about 80° C. for about 1 to about 60 minutes), or air-blown.

When an uncured primer coating film is formed on the article to be coated, it may be left to stand for an interval after application of the primer coating, or it may be preheated or air-blown.

In step 2-1, heating of the clear coating film may be carried out in the same manner as step 1-4.

In Method II, the aqueous coating composition may be applied to a cured film thickness in the range of usually about 5 to about 50 μm, preferably about 10 to about 45 μm and more preferably about 20 to about 40 μm.

Also, when a primer coating film is formed on the article to be coated, the primer coating is applied to a cured film thickness in the range of usually about 3 to about 40 μm, preferably about 5 to about 30 μm and more preferably about 7 to about 20 μm.

The aqueous coating composition of the invention may be used as a base coat material for a base coating film on an article to be coated such as an automobile body or an automobile part, by a method of forming a multilayer coating film comprising a base coating film and a clear coating film by a 2-coat, 1-bake system.

The method may be carried out according to method III below, for example.

[Method III]

Method III includes the following steps 3-1 to 3-3.

Step 3-1: A step of coating an article to be coated with an aqueous coating composition for a base coat, and forming an uncured base coating film on the article to be coated.

Step 3-2: A step of coating the article to be coated having the uncured base coating film with a clear coating material, and forming an uncured clear coating film thereover.

Step 3-3: A step of heating and curing the uncured base coating film and uncured clear coating film.

Heating of the base coating film and clear coating film may be accomplished in the same manner as step 1-4.

Also, in step 3-1 and/or step 3-2, the uncured base coating film and/or the uncured clear coating film is optionally allowed to stand at room temperature for an interval of about 1 to about 60 minutes, or it is preheated under heating conditions in which the coating film essentially does not cure (for example, a temperature of about 40° C. to about 80° C. for about 1 to about 60 minutes), or air-blown.

The base coating film is coated to a cured film thickness in the range of usually about 3 to about 50 μm, preferably about 5 to about 35 μm and more preferably about 10 to about 20 μm. Also, the clear coating material is applied to a cured film thickness in a range of usually about 10 to about 80 μm, preferably about 15 to about 60 μm and more preferably about 20 to about 45 μm.

EXAMPLES

The present invention will now be explained in greater detail using examples and comparative examples. However, it is to be understood that the invention is not limited only to these examples. The "parts" and "%" values are all based on mass. Also, the film thicknesses of the coating films are based on the cured coating films.

[Production of Hydroxyl Group-Containing Acrylic Resin (AC)]

Production Example 1

To a reactor equipped with a thermometer, thermostat, stirrer, reflux condenser and water separator there were added 60 parts of ethylene glycol monobutyl ether and 15 parts of isobutyl alcohol, and the contents were heated to 110° C. under a nitrogen stream. When the temperature of the contents reached 110° C., a mixture of 10 parts of styrene, 48 parts of methyl methacrylate, 26 parts of n-butyl acrylate, 10 parts of 2-hydroxyethyl methacrylate, 6 parts of acrylic acid and 1 part of azobisisobutyronitrile was added dropwise to the reactor over a period of 3 hours.

Upon completion of the addition, it was aged at 110° C. for 30 minutes, and a mixture of 1 part of azobisisobutyronitrile and 15 parts of ethyleneglycol monobutyl ether was added dropwise into the reactor over 1 hour. After further ageing at 110° C. for 1 hour, the mixture was cooled and neutralized with an equal amount of dimethylaminoethanol, and deionized water was added to obtain a hydroxyl group-containing acrylic resin (AC) solution. The solid content of the hydroxyl group-containing acrylic resin (AC) solution was 50%.

[Production of Hydroxyl Group-Containing Polyester Resin (PE)]

Production Example 2

After adding 109 parts of trimethylolpropane, 141 parts of 1,6-hexanediol, 126 parts of 1,2-cyclohexanedicarboxylic anhydride and 120 parts of adipic acid into a reactor equipped with a thermometer, thermostat, stirrer, reflux condenser and water separator, the contents were heated from 160° C. to 230° C. over a period of 3 hours, and the contents were subjected to condensation reaction at 230° C. for 4 hours while distilling off the produced condensation water with a water separator.

Next, 38.3 parts of trimellitic anhydride was further added to the reactor for addition of carboxyl groups to the obtained condensation reaction product, reaction was conducted at 170° C. for 30 minutes, and then the contents were diluted with ethyleneglycol monobutyl ether to obtain a hydroxyl group-containing polyester resin (PE) solution with a solid concentration of 70%. The hydroxyl group-containing polyester resin (PE) had an acid value of 46 mgKOH/g, a hydroxyl value of 150 mgKOH/g and a number-average molecular weight of 1,400.

[Production of Pigment Dispersion]

Production Example 3

After adding 42.9 parts of the hydroxyl group-containing polyester resin (PE) solution obtained in Production Example 2 (solid content: 30 parts), 112 parts of "JR-806" (trade name of Tayca Corp., rutile titanium dioxide), 8 parts of "Ketchen black EC600 J" (trade name of Lion Corp., conductive carbon) and 137.1 parts of deionized water to a mixing vessel, the contents were mixed. Next, 2-(dimethylamino)ethanol was used to adjust the pH of the contents to 8.0. Next, the contents were placed in a wide-mouth glass bottle together with glass beads having approximately 1.3 mmφ diameters as dispersion media, the wide-mouth glass bottle was sealed, and the wide-mouth glass bottle shaken for 4 hours with a paint shaker to obtain a pigment dispersion (P-1).

Production Example 4

Pigment dispersion (P-2) was obtained in the same manner as Production Example 3, except that the amount of JR-806 was changed from 112 parts to 264 parts.

Production Example 5

[Production of Primer Coating (X)]
After adding 30 parts of a solution of the hydroxyl group-containing acrylic resin (AC) obtained in Production Example 1 (solid content: 15 parts), 50 parts of "TAKELAC WS5000" (solid content: 15 parts) (trade name of Mitsui Takeda Chemicals, Inc., polyurethane dispersion, silanol group-containing self-crosslinking type, solid content: 30%), 133.3 parts of "SUPERCHLON E-403" (solid content: 40 parts) (trade name of Nippon Paper Group, Inc., aqueous dispersion of chlorinated polypropylene, chlorine content of resin: 15%, solid content: 30%) and 300 parts of the pigment dispersion (P-1) obtained in Production Example 3 to a mixing vessel, the contents were mixed, and then the pH, concentration and viscosity were adjusted with "ACRYSOL ASE-60" (trade name of Rohm & Haas, polyacrylic acid-based thickening agent), 2-(dimethylamino)ethanol and deionized water, to obtain an aqueous primer coating material (X-1) having a pH of 8.0, a solid concentration of 45% and a viscosity of 40 seconds (Ford cup No. 4, 20° C.).
[Aqueous Dispersion of Acryl-Modified Polyester Resin (A)]

Production Example 6

After adding 92.4 parts of hexahydrophthalic anhydride, 52.6 parts of adipic acid, 82.6 parts of 1,6-hexanediol, 10.5 part of neopentyl glycol, 32 parts of 2-butyl-2-ethyl-1,3-propanediol, 1.96 parts of maleic anhydride and 0.12 part of dibutyltin oxide to a reactor equipped with a thermometer, thermostat, stirrer, heating apparatus and rectification column, the reactor was increased in temperature to 160° C. while stirring. Next, the temperature of the contents was gradually increase from 160° C. to 240° C. over a period of 4 hours, and the condensation water that was generated was distilled off through the rectification column.

After continuing the reaction at 240° C. for 90 minutes, the rectification column was replaced with a water separator, approximately 15 parts of toluene was added to the reactor, and the water and toluene were azeotropically distilled off to remove the condensation water. One hour after toluene addition, measurement of the acid value of the contents was initiated, and heating was stopped when the acid value of the contents was confirmed to be lower than 3.5. Next, the toluene was distilled off from the reactor under reduced pressure, the reactor was cooled, and then 58 parts of 2-butyl-2-ethyl-1,3-propanediol was added to the reactor. After cooling the reactor to 130° C., a mixture of 8.7 parts of styrene, 12.2 parts of acrylic acid, 22.7 parts of 2-ethylhexyl acrylate and 2.2 parts of tert-butylperoxy-2-ethyl hexanoate was added dropwise to the reactor over a period of 2 hours.

After maintaining a temperature of 130° C. for 30 minutes, 0.44 part of tert-butylperoxy-2-ethyl hexanoate was added to the reactor as an additional catalyst, and the mixture was aged for 1 hour. Next, the reactor was cooled to 85° C., the contents were neutralized with 14.6 parts of dimethylethanolamine, and 468.7 parts of deionized water was added to the contents forming an aqueous dispersion from the contents to obtain an acryl-modified aqueous polyester resin dispersion (A-1) with a solid content of 35%. The obtained acryl-modified aqueous polyester resin had an acid value of 35 mgKOH/g, a hydroxyl value of 11 mgKOH/g and a number-average molecular weight of 13,000.

Production Examples 7 to 15

Acryl-modified aqueous polyester resin aqueous dispersions (A-2) to (A-10) were obtained in the same manner as Production Example 6, except that the composition was changed as shown in Table 1 below.

TABLE 1

| | | | | Production Example No. | | | | | | | | | |
|---|---|---|---|---|---|---|---|---|---|---|---|---|---|
| | | | | 6 | 7 | 8 | 9 | 10 | 11 | 12 | 13 | 14 | 15 |
| Aqueous dispersion of acryl-modified polyester resin (A) | | | | A-1 | A-2 | A-3 | A-4 | A-5 | A-6 | A-7 | A-8 | A-9 | A-10 |
| PE portion | Acid component ($a_{111}$) | Alicyclic polybasic acid | Hexahydrophthalic anhydride | 92.4 | 123.2 | 149.4 | 46.2 | 92.4 | — | 46.2 | 46.2 | 46.2 | 92.4 |
| | | Aliphatic polybasic acid | Adipic acid | 52.6 | — | — | 98.6 | 49.6 | 140.2 | 96.3 | 96.3 | 96.3 | 52.56 |
| | | Acid anhydride | Maleic anhydride | 1.96 | 2.94 | 1.96 | 1.96 | — | 1.96 | 1.96 | 1.96 | 1.96 | 1.96 |
| | | | Fumaric anhydride | — | — | — | — | 4.6 | — | — | — | — | — |
| | Alcohol component ($a_{112}$) | 1,6-Hexanediol | | 82.6 | — | 106.2 | 82.6 | 82.6 | 82.6 | 82.6 | 82.6 | 82.6 | 82.6 |
| | | Neopentyl glycol | | 10.5 | — | 17.9 | 10.5 | 10.5 | 10.5 | 10.5 | 10.5 | 10.5 | 10.5 |
| | | 2-Butyl-2-ethyl-1,3-propanediol | | 32.0 | 96.0 | — | 32.0 | 32.0 | 32.0 | 32.0 | 32.0 | 32.0 | 32 |
| | | Trimethylolpropane | | — | 54.6 | — | — | — | — | — | — | — | — |
| | Catalyst | Dibutyltin oxide | | 0.12 | — | 0.12 | 0.12 | 0.12 | 0.12 | 0.12 | 0.12 | 0.12 | 0.12 |

TABLE 1-continued

| | | | | Production Example No. | | | | | | | | | |
|---|---|---|---|---|---|---|---|---|---|---|---|---|---|
| | | | | 6 | 7 | 8 | 9 | 10 | 11 | 12 | 13 | 14 | 15 |
| Ac portion | Polymerizable unsaturated monomer ($a_{12}$) | Aromatic ring-containing | Styrene | 8.7 | 9.2 | 9.1 | 8.5 | 7.9 | 8.2 | 8.5 | — | 20.6 | 8.7 |
| | | Carboxyl group-containing | Acrylic acid | 12.2 | — | 10.6 | 11.9 | 11.0 | 11.5 | — | 11.9 | 28.8 | 12.2 |
| | | | Methacrylic acid | — | 14.2 | — | — | — | — | — | — | — | — |
| | | Other | 2-Ethylhexyl acrylate | 22.7 | 22.8 | 25.8 | 22.2 | 20.5 | 21.3 | 21.2 | 21.2 | 53.5 | — |
| | | | n-Butyl acrylate | — | — | — | — | — | — | 12.7 | 9.3 | — | — |
| | | | Isobutyl methacrylate | — | — | — | — | — | — | — | — | — | 11.4 |
| | | | 2-Hydroxyethyl methacrylate | — | — | — | — | — | — | — | — | — | 11.3 |
| | Initiator | t-Butylperoxy-2-ethylhexanoate | | 2.2 | 2.3 | 2.3 | 2.1 | 2.0 | 2.0 | 2.1 | 2.1 | 5.1 | 2.2 |
| Characteristic values | | Number-average molecular weight | | 13,000 | 1600 | 18,000 | 22,000 | 13,000 | 13,000 | 13,000 | 13,000 | 13,000 | 13,000 |
| | | Acid value (mgKOH/g) | | 35 | 33 | 30 | 35 | 35 | 35 | 3 | 35 | 35 | 35 |
| | | Hydroxyl value (mgKOH/g) | | 11 | 140 | 6 | 3 | 11 | 11 | 11 | 11 | 11 | 28 |
| | | Polyester/acryl ratio | | 85/15 | 85/15 | 85/15 | 85/15 | 85/15 | 85/15 | 85/15 | 85/15 | 70/30 | 85/15 |

Production Example 16

To a reactor equipped with a thermometer, thermostat, stirrer, heating apparatus and rectification column there were added 92.4 parts of hexahydrophthalic anhydride, 55.5 parts of adipic acid, 32 parts of 2-butyl-2-ethyl-1,3-propanediol, 82.6 parts of 1,6-hexanediol, 10.5 part of neopentyl glycol and 0.12 part of dibutyltin oxide, the reactor was increased in temperature to 160° C. while stirring the contents, and then the temperature of the reactor was gradually increased from 160° C. to 240° C. over a period of 4 hours, distilling off the generated condensation water through the rectification column.

After continuing the reaction at 240° C. for 90 minutes, the rectification column was replaced with a water separator, toluene was added to the reactor, and the water and toluene were azeotropically distilled off to remove the condensation water. One hour after toluene addition, measurement of the acid value of the contents was initiated, and when the acid value of the contents was confirmed to be lower than 3.5, the toluene was removed from the reactor under reduced pressure and the reactor was cooled to 130° C. Next, 177.5 parts (solid content: 106.5 parts) of a solution of a modifying acrylic resin[1], described below, was added to the reactor, and the xylene was removed under reduced pressure.

The temperature of the reactor was subsequently kept at 175° C., and when the acid value of the contents was confirmed to be below 35, heating of the reactor was stopped and the contents were cooled. Next, the reactor was cooled to 85° C., 1.77 parts of diethylethanolamine and 657.5 parts of deionized water were added to the contents, and then the contents were dispersed in water to obtain a polyester resin aqueous dispersion (A-11) with a solid content of 35%. The obtained polyester resin had an acid value of 35 mgKOH/g, a hydroxyl value of 9 mgKOH/g and a number-average molecular weight of 13,000.

1) Production of Modifying Acrylic Resin

After adding 50 parts of xylene to a reactor equipped with a thermometer, thermostat, stirrer, reflux condenser and water separator, the reactor was heated to 135° C. under a nitrogen stream. When the temperature of the reactor reached 135° C., a mixture of 82.2 parts of n-butyl acrylate, 17.8 parts of acrylic acid and 6.5 parts of tert-butylperoxy-2-ethyl hexanoate was added dropwise to the reactor over a period of 4 hours. Upon completion of the dropwise addition, the reactor was kept at 135° C. for 30 minutes, and then a mixture of 0.2 part of tert-butylperoxy-2-ethyl hexanoate and 4 parts of xylene was added dropwise to the reactor over a period of one hour. The reactor was kept at 135° C. for 1 hour, and after cooling the reactor, the contents were diluted with 18.3 parts of xylene to obtain a modifying acrylic resin. The solid content of the modifying acrylic resin was 60%.

[Production of Polyester Resin Aqueous Dispersion (A-12)]

Production Example 17

After adding 82.6 parts of 1,6-hexanediol, 10.5 part of neopentyl glycol, 32.0 parts of 2-butyl-2-ethyl-1,3-propanediol, 46.2 parts of hexahydrophthalic anhydride, 99.3 parts of adipic acid and 0.12 part of dibutyltin oxide to a reactor equipped with a thermometer, thermostat, stirrer, reflux condenser and water separator, the contents were increased in temperature to 160° C. while stirring. Next, the temperature of the contents was gradually increased from 160° C. to 240° C. over a period of 4 hours, and then the contents were subjected to condensation reaction at 240° C. for 4 hours to obtain a condensation reaction product.

Next, 13.4 parts of trimellitic anhydride was added to the condensation reaction product, and reaction was conducted at 170° C. for 30 minutes for addition of carboxyl groups to the condensation reaction product. The condensation reaction product was then diluted with 2-ethyl-1-hexanol to obtain a polyester resin aqueous dispersion (A-12) with a solid concentration of 70%. The obtained polyester resin had an acid value of 35 mgKOH/g, a hydroxyl value of 6 mgKOH/g and a number-average molecular weight of 6,000.

[Production of Blocked Polyisocyanate Compound (B)]

Production Example 18

After adding 1610 parts of "SUMIDUR N-3300" (trade name of Sumika Bayer Urethane Co., Ltd., polyisocyanate containing isocyanurate structure derived from hexamethylene diisocyanate, solid content: approximately 100%, isocyanate group content: 21.8%), 275 parts of "UNIOX M-550" (product of NOF Corp., polyethylene glycol monomethyl ether, average molecular weight: approximately 550) and 0.9 part of 2,6-di-tert-butyl-4-methylphenol to a reactor equipped with a thermometer, thermostat, stirrer, reflux condenser, nitrogen inlet tube, dropper and simple trap for the removed solvent, the contents were mixed and the reactor was heated under a nitrogen stream at 130° C. for 3 hours.

Next, 550 parts of ethyl acetate and 1150 parts of diisopropyl malonate were added to the reactor. After then adding 14 parts of a 28% methanol solution of sodium methoxide to the reactor while stirring under a nitrogen stream, the contents were stirred at 65° C. for 8 hours to obtain a resin solution. The obtained resin solution had an isocyanate content of approximately 0.1 mol/kg.

Next, 3110 parts of 4-methyl-2-pentanol was added to the reactor and the temperature of the reactor was kept at 80° C. to 85° C. while distilling off the solvent from the reactor under reduced pressure over a period of 3 hours, to obtain 4920 parts of a solution of blocked polyisocyanate compound (B-1). The simple trap for the removed solvent included 585 parts of isopropanol. The solid concentration of the blocked polyisocyanate compound (B-1) solution was approximately 60%.

Production Example 19

After adding 1610 parts of "SUMIDUR N-3300", 275 parts of "UNIOX M-550", 25 parts of "PEG #600" (product of NOF Corp., polyethylene glycol, average molecular weight: approximately 600) and 0.9 part of 2,6-di-tert-butyl-4-methylphenol to a reactor equipped with a thermometer, thermostat, stirrer, reflux condenser, nitrogen inlet tube, dropper and simple trap for the removed solvent, the contents were stirred while heating the reactor at 130° C. for 3 hours under a nitrogen stream.

Next, 550 parts of ethyl acetate and 1140 parts of diisopropyl malonate were added to the reactor, the contents were stirred while adding 14 parts of a 28% methanol solution of sodium methoxide to the reactor under a nitrogen stream, and the reactor was kept at 65° C. for 8 hours to obtain a resin solution. The obtained resin solution had an isocyanate content of approximately 0.1 mol/kg. After adding 3080 parts of 4-methyl-2-pentanol to the reactor, the temperature of the reactor was kept at 80° C. to 85° C. while distilling off the solvent from the reactor over a period of 3 hours under reduced pressure to obtain 4930 parts of a solution of blocked polyisocyanate compound (B-2). The simple trap for the removed solvent included 580 parts of isopropanol. The solid concentration of the blocked polyisocyanate compound (B-2) solution was approximately 60%.

Production Example 20

After adding 1510 parts of "DURANATE TPA-100" (trade name of Asahi Kasei Chemicals Corp., polyisocyanate containing isocyanurate structure derived from hexamethylene diisocyanate, solid content: approximately 100%, isocyanate group content: 23.0%), 275 parts of "UNIOX M-550" and 0.9 part of 2,6-di-tert-butyl-4-methylphenol to a reactor equipped with a thermometer, thermostat, stirrer, reflux condenser, nitrogen inlet tube, dropper and simple trap for the removed solvent, the contents were stirred while heating the reactor under a nitrogen stream at 130° C. for 3 hours.

Next, 550 parts of ethyl acetate and 975 parts of diethyl malonate were added to the reactor, and then the contents were stirred while adding 14 parts of a 28% methanol solution of sodium methoxide to the reactor under a nitrogen stream, and the reactor was kept at 65° C. for 8 hours to obtain a resin solution. The obtained resin solution had an isocyanate content of approximately 0.1 mol/kg.

After then adding 3110 parts of 4-methyl-2-pentanol to the reactor, the temperature of the reactor was kept at 80° C. to 85° C. while distilling off the solvent from the reactor over a period of 3 hours under reduced pressure to obtain 4530 parts of a solution of blocked polyisocyanate compound (B-3). The simple trap for the removed solvent included 340 parts of ethanol. The solid concentration of the blocked polyisocyanate compound (B-3) solution was approximately 60%.

Production Example 21

After adding 1610 parts of "SUMIDUR N-3300", 275 parts of "UNIOX M-550" and 0.9 part of 2,6-di-tert-butyl-4-methylphenol into a reactor equipped with a thermometer, thermostat, stirrer, reflux condenser, nitrogen inlet tube, dropper and simple trap for the removed solvent, the contents were stirred while heating the reactor at 130° C. for 3 hours under a nitrogen stream.

Next, 550 parts of ethyl acetate and 1150 parts of diisopropyl malonate were added to the reactor, and then the contents were stirred while adding 14 parts of a 28% methanol solution of sodium methoxide to the reactor under a nitrogen stream, and the reactor was kept at 65° C. for 8 hours to obtain a resin solution. The obtained resin solution had an isocyanate content of approximately 0.1 mol/kg.

After then adding 3970 parts of 6-methyl-2-heptanol to the reactor, the temperature of the reactor was kept at 80° C. to 85° C. while distilling off the solvent from the reactor over a period of 3 hours under reduced pressure to obtain 5310 parts of a solution of blocked polyisocyanate compound (B-4). The simple trap for the removed solvent included 585 parts of isopropanol. The solid concentration of the blocked polyisocyanate compound (B-4) solution was approximately 60%.

Production Example 22

After adding 1610 parts of "SUMIDUR N-3300" (trade name of Sumika Bayer Urethane Co., Ltd., polyisocyanate containing isocyanurate structure derived from hexamethylene diisocyanate, solid content: approximately 100%, isocyanate group content: 21.8%), 275 parts of "UNIOX M-550" (product of NOF Corp., polyethyleneglycol monomethyl ether, average molecular weight: approximately 550) and 0.9 part of 2,6-di-tert-butyl-4-methylphenol to a reactor equipped with a thermometer, thermostat, stirrer, reflux condenser, nitrogen inlet tube, dropper and simple trap for the removed solvent, the contents were stirred while heating the reactor under a nitrogen stream at 130° C. for 3 hours.

Next, 550 parts of ethyl acetate and 1150 parts of diisopropyl malonate were added to the reactor, the contents were stirred while adding 14 parts of a 28% methanol solution of sodium methoxide to the reactor under a nitrogen stream, and the reactor was kept at 65° C. for 8 hours to obtain a solution of a blocked polyisocyanate compound (B-5). The solution of the blocked polyisocyanate compound (B-5) had an isocyanate content of approximately 0.1 mol/kg and a solid concentration of approximately 60%.

Production Example 23

After adding 1610 parts of "SUMIDUR N-3300" and 236 parts of hydroxypivalic acid into a reactor equipped with a thermometer, thermostat, stirrer, reflux condenser, nitrogen inlet tube, dropper and simple trap for the removed solvent, the contents were stirred while heating the reactor at 130° C. for 3 hours under a nitrogen stream.

Next, 550 parts of ethyl acetate and 930 parts of diisopropyl malonate were added to the reactor, the contents were stirred while adding 14 parts of a 28% methanol solution of sodium methoxide to the reactor under a nitrogen stream, and the reactor was kept at 65° C. for 8 hours. The obtained resin solution had an isocyanate content of approximately 0.1 mol/kg.

After then adding 2530 parts of 4-methyl-2-pentanol to the reactor, the temperature of the reactor was kept at 80° C. to 85° C. while distilling off the solvent from the reactor over a period of 3 hours under reduced pressure to obtain 4450 parts of a solution of a blocked polyisocyanate compound (B-6). The simple trap for the removed solvent included 475 parts of isopropanol. The solid concentration of the blocked polyisocyanate compound (B-6) solution was approximately 60%.

Production Example 24

After adding 480 parts of "SUMIDUR N-3300" (trade name of Sumika Bayer Urethane Co., Ltd., polyisocyanate containing isocyanurate structure derived from hexamethylene diisocyanate, solid content: approximately 100%, isocyanate group content: 21.8%), 150 parts of ethyl acetate and 365 parts of diisopropyl malonate into a reactor equipped with a thermometer, thermostat, stirrer, reflux condenser, nitrogen inlet tube, dropper and simple trap for the removed solvent, 4 parts of a 28% methanol solution of sodium methoxide was added to the reactor while stirring the contents under a nitrogen stream and the mixture was stirred at 65° C. for 8 hours.

The obtained resin solution had an isocyanate content of approximately 0.07 mol/kg. After then adding 870 parts of 4-methyl-2-pentanol to the reactor, the temperature of the reactor was kept at 80° C. to 85° C. while distilling off the solvent from the reactor over a period of 3 hours under reduced pressure. Next, 120 parts of 4-methyl-2-pentanol was added to the reactor to obtain 1400 parts of a solution of blocked polyisocyanate compound (B-7). The simple trap for the removed solvent included 183 parts of isopropanol. The solid concentration of the blocked polyisocyanate compound (B-7) solution was approximately 60%.

[Production of Aqueous Dispersion of Acrylic-Based Polymer Fine Particles (C)]

Production Example 25

After adding 120 parts of deionized water and 0.8 part of "ADEKA REASOAP SR-1025" (trade name of Adeka Corp., emulsifying agent, active ingredient: 25%) to a reactor equipped with a thermometer, thermostat, stirrer, reflux condenser, nitrogen inlet tube and dropper, the contents were stirred while increasing the temperature of the reactor to 80° C. under a nitrogen stream.

Next, 5% of the total core section monomer emulsion described below and 2.5 parts of a 6% ammonium persulfate aqueous solution were introduced into the reactor, and the mixture was kept at 80° C. for 15 minutes. The remainder of the core section monomer emulsion was then added dropwise to the reactor kept at the same temperature over a period of 3 hours, and upon completion of the dropwise addition the mixture was aged for 1 hour.

Next, the shell section monomer emulsion was added dropwise over a period of 1 hour and aged for 1 hour, and the mixture was then cooled to 30° C. while gradually adding 3.8 parts of a 5% 2-(dimethylamino)ethanol aqueous solution to the reactor, and subsequently discharged while filtering with a 100 mesh nylon cloth, to obtain an aqueous dispersion of acrylic-based polymer fine particles (C-1) with a mean particle diameter of 100 nm and a solid content of 30%. The obtained acrylic-based polymer fine particles had an acid value of 17.2 mgKOH/g and a hydroxyl value of 27.2 mgKOH/g.

Core Section Monomer Emulsion:

A core section monomer emulsion was obtained by mixing 54 parts of deionized water, 3.1 parts of "ADEKA REASOAP SR-1025", 1 part of allyl methacrylate, 10 parts of styrene, 35 parts of n-butyl acrylate, 10 parts of methyl methacrylate, 20 parts of ethyl acrylate and 1 part of 2-hydroxyethyl methacrylate.

Shell Section Monomer Emulsion:

A shell section monomer emulsion was obtained by mixing 50 parts of deionized water, 1.8 parts of "ADEKA REASOAP SR-1025", 0.04 part of a 6% ammonium persulfate aqueous solution, 5.3 parts of 2-hydroxyethyl methacrylate, 2.6 parts of methacrylic acid, 8 parts of ethyl acrylate and 7.1 parts of methyl methacrylate.

Production Examples 26 to 30

Aqueous dispersions of acrylic-based polymer fine particles (C-2) to (C-6) were obtained in the same manner as Production Example 25, except that the compositions were changed as shown in Table 2.

TABLE 2

|  |  |  | Production Example | | | | | |
|---|---|---|---|---|---|---|---|---|
|  |  |  | 25 | 26 | 27 | 28 | 29 | 30 |
| No. of aqueous dispersion of acrylic-based polymer fine particles | | | C-1 | C-2 | C-3 | C-4 | C-5 | C-6 |
| Deionized water | | | 120 | 120 | 120 | 120 | 120 | 120 |
| ADEKA REASOAP SR-1025 | | | 0.8 | 0.8 | 0.8 | 0.8 | 0.8 | 0.8 |
| 6% Ammonium persulfate aqueous solution | | | 2.5 | 2.5 | 2.5 | 2.5 | 2.5 | 2.5 |
| Monomer emulsion for core section | Deionized water | | 54 | 104 | 54 | 54 | 54 | 54 |
| | ADEKA REASOAP SR-1025 | | 3.1 | 4.9 | 3.1 | 3.1 | 3.1 | 3.1 |
| | Monomer (I$_1$) | AMA | 1 | 0 | 1 | 0 | 1 | 1 |
| | Monomer (I$_2$) Hydrophobic polymerizable unsaturated monomer | St | 10 | 10 | 0 | 10 | 10 | 10 |
| | | nBA | 35 | 33 | 0 | 36 | 35 | 35 |
| | | MMA | 10 | 18.1 | 45 | 10 | 10 | 10 |
| | | EA | 20 | 30 | 30 | 20 | 20 | 20 |
| | | HEMA | 1 | 6.3 | 1 | 1 | 1 | 1 |
| | | MAAc | — | 2.6 | — | — | — | — |

TABLE 2-continued

|  |  |  | Production Example | | | | | |
|---|---|---|---|---|---|---|---|---|
|  |  |  | 25 | 26 | 27 | 28 | 29 | 30 |
| emulsion for | Deionized water |  | 50 | — | 50 | 50 | 50 | 50 |
|  | ADEKA REASOAP SR-1025 |  | 1.8 | — | 1.8 | 1.8 | 1.8 | 1.8 |
|  | 6% Ammonium persulfate aqueous solution |  | 0.04 | — | 0.04 | 0.04 | 0.04 | 0.04 |
|  | Hydroxyl group-containing polymerizable unsaturated monomer (II$_1$) | HEMA | 5.3 | — | 5.3 | 5.3 | 5.3 | 5.3 |
|  | Carboxyl group-containing polymerizable unsaturated monomer (II$_2$) | MAAc | 2.6 | — | 2.6 | 2.6 | 8 | 0.1 |
|  | Other polymerizable unsaturated monomer (II$_3$) | St | — | — | — | — | — | 1.5 |
|  |  | nBA | — | — | — | — | — | 1 |
|  |  | MMA | 7.1 | — | 7.1 | 7.1 | 4 | 7.1 |
|  |  | EA | 8 | — | 8 | 8 | 5.7 | 8 |
| 5% Aqueous 2-(dimethylamino)ethanol solution |  |  | 3.8 | 3.8 | 3.8 | 3.8 | 3.8 | 3.8 |
| Solid concentration (%) |  |  | 30 | 30 | 30 | 30 | 30 | 30 |
| Acid value (mgKOH/g) |  |  | 17.2 | 17.2 | 17.2 | 17.2 | 52.2 | 0.65 |
| Hydroxyl value (mgKOH/g) |  |  | 27.2 | 27.2 | 27.2 | 27.2 | 27.2 | 27.2 |

The monomer abbreviations in Table 2 have the following meanings.
AMA: Allyl methacrylate
St: Styrene
nBA: n-Butyl acrylate
MMA: Methyl methacrylate
EA: Ethyl acrylate
HEMA: 2-Hydroxyethyl methacrylate
MAAc: Methacrylic acid

[Production of Luster Pigment Dispersion (AL)]

Production Example 31

A luster pigment dispersion (AL) was obtained by uniformly mixing 17.5 parts of the aluminum pigment paste "GX-180A" (trade name of Asahi Kasei Metals Co., Ltd., metal content: 74%), 34.8 parts of 2-ethyl-1-hexanol, 10 parts of a phosphate group-containing dispersed resin solution[2]) (solid content: 5 parts) and 0.2 part of 2-(dimethylamino)ethanol in a mixing vessel.

2) Solution of Phosphate Group-Containing Dispersed Resin:

After adding a mixed solvent comprising 27.5 parts of methoxypropanol and 27.5 parts of isobutanol into a reactor equipped with a thermometer, thermostat, stirrer, reflux condenser, nitrogen inlet tube and dropper and heating the reactor to 110° C., 121.5 parts of a mixture comprising 25 parts of styrene, 27.5 parts of n-butyl methacrylate, 20 parts of "Isostearyl Acrylate" (trade name of Osaka Organic Chemical Industry, Ltd., branched higher alkyl acrylate), 7.5 parts of 4-hydroxybutyl acrylate, 15 parts of a phosphate group-containing polymerizable unsaturated monomer[3]), 12.5 parts of 2-methacryloyloxyethyl acid phosphate, 10 parts of isobutanol and 4 parts of tert-butyl peroxyoctanoate was added to the reactor over a period of 4 hours.

Next, a mixture comprising 0.5 part of tert-butyl peroxyoctanoate and 20 parts of isopropanol was added dropwise to the reactor over a period of one hour. The contents were then aged while stirring for 1 hour, to obtain a solution of a phosphate group-containing dispersed resin with a solid concentration of 50%. The phosphate group-containing dispersed resin had an acid value of 83 mgKOH/g, a hydroxyl value of 29 mgKOH/g and a weight-average molecular weight of 10,000.

3) Phosphate Group-Containing Polymerizable Unsaturated Monomer:

After placing 57.5 parts of monobutylphosphoric acid and 41 parts of isobutanol in a reactor equipped with a thermometer, thermostat, stirrer, reflux condenser, nitrogen inlet tube and dropper, the reactor was heated to 90° C., and 42.5 parts of glycidyl methacrylate was added to the reactor dropwise over a period of 2 hours, and then the contents were stirred for 1 hour for ageing. Next, 59 parts of isopropanol was added to the reactor to obtain a phosphate group-containing a polymerizable unsaturated monomer solution with a solid concentration of 50%. The obtained phosphate group-containing polymerizable unsaturated monomer had a phosphate group-derived acid value of 285 mgKOH/g.

[Production of Aqueous Colored Coating (Y)]

Examples

After placing 50.0 parts of the aqueous dispersion of an acryl-modified polyester resin (A-1) obtained in Production Example 6 (solid content: 40 parts), 16.7 parts of the solution of the blocked polyisocyanate compound (B-1) obtained in Production Example 18 (solid content: 10 parts), 133.3 parts of the hydroxyl group-containing aqueous dispersion of acrylic-based polymer fine particles (C-1) obtained in Production Example 25 (solid content: 35 parts), 12.5 parts of "SAIMEL 325" (melamine resin, trade name of Nihon Cytec Industries Inc., solid content: 80%) (solid content: 10 parts), 67.5 parts of the luster pigment dispersion (AL) obtained in Production Example 31 (resin solid content: 5 parts) and 10 parts of 2-ethyl-1-hexanol in a mixing vessel, the contents were uniformly mixed, and then the pH, solid concentration and viscosity were adjusted using "ACRYSOL ASE-60", 2-(dimethylamino)ethanol and deionized water, to obtain an aqueous colored coating (Y-1) having a pH of 8.0, a solid concentration of 25% and a viscosity of 40 seconds (Ford cup No.4, 20° C.).

Examples 2 to 28 and Comparative Examples 1 to 4

Aqueous colored coatings (Y-2) to (Y-32) were obtained in the same manner as Example 1, except that the compositions were changed as shown in Table 3 below.

The amounts in Table 3 are all solid content values.

TABLE 3

| | | Example | | | | | | | | | | | | | | | | |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 |
| Aqueous colored coating | | Y-1 | Y-2 | Y-3 | Y-4 | Y-5 | Y-6 | Y-7 | Y-8 | Y-9 | Y-10 | Y-11 | Y-12 | Y-13 | Y-14 | Y-15 | Y-16 | Y-17 |
| Aqueous dispersion of acryl-modified polyester resin (A) | | A-1 40 | A-2 40 | A-3 40 | A-4 40 | A-5 40 | A-6 40 | A-7 40 | A-8 40 | A-9 40 | A-10 40 | A-11 40 | A-1 40 | A-1 40 | A-1 40 | A-1 40 | A-1 40 | A-1 40 |
| Blocked polyisocyanate compound (B) | | B-1 10 | B-1 10 | B-1 10 | B-1 10 | B-1 10 | B-1 10 | B-1 10 | B-1 10 | B-1 10 | B-1 10 | B-1 10 | B-2 10 | B-3 10 | B-4 10 | B-5 10 | B-1 10 | B-1 10 |
| Aqueous dispersion of acrylic-based polymer fine particles (C) | | C-1 35 | C-1 35 | C-1 35 | C-1 35 | C-1 35 | C-1 35 | C-1 35 | C-1 35 | C-1 35 | C-1 35 | C-1 35 | C-1 35 | C-1 35 | C-1 35 | C-1 35 | C-2 35 | C-3 35 |
| | SAIMEL 325 | 10 | 10 | 10 | 10 | 10 | 10 | 10 | 10 | 10 | 10 | 10 | 10 | 10 | 10 | 10 | 10 | 10 |
| Luster pigment dispersion (AL) | Phosphate group-containing dispersed resin | 5 | 5 | 5 | 5 | 5 | 5 | 5 | 5 | 5 | 5 | 5 | 5 | 5 | 5 | 5 | 5 | 5 |
| | GX-180A | 17.5 | 17.5 | 17.5 | 17.5 | 17.5 | 17.5 | 17.5 | 17.5 | 17.5 | 17.5 | 17.5 | 17.5 | 17.5 | 17.5 | 17.5 | 17.5 | 17.5 |
| Pigment dispersion (P-2) | Hydroxyl-containing polyester resin (PE) | — | — | — | — | — | — | — | — | — | — | — | — | — | — | — | — | — |
| | JR-806 | — | — | — | — | — | — | — | — | — | — | — | — | — | — | — | — | — |

| | | Example | | | | | | | | | | | Comp. Example | | | |
|---|---|---|---|---|---|---|---|---|---|---|---|---|---|---|---|---|
| | | 18 | 19 | 20 | 21 | 22 | 23 | 24 | 25 | 26 | 27 | 28 | 1 | 2 | 3 | 4 |
| Aqueous colored coating | | Y-18 | Y-19 | Y-20 | Y-21 | Y-22 | Y-23 | Y-24 | Y-25 | Y-26 | Y-27 | Y-28 | Y-29 | Y-30 | Y-31 | Y-32 |
| Aqueous dispersion of acryl-modified polyester resin (A) | | A-1 40 | A-1 40 | A-1 40 | A-1 10 | A-1 15 | A-1 60 | A-1 70 | A-1 40 | A-1 35 | A-1 40 | A-1 40 | A-11 40 | A-1 40 | A-1 40 | A-1 45 |
| Blocked polyisocyanate compound (B) | | B-1 10 | B-1 10 | B-1 10 | B-1 15 | B-1 20 | B-1 5 | B-1 5 | B-1 1 | B-1 30 | B-1 20 | B-1 10 | B-5 10 | B-6 10 | B-7 10 | — |
| Aqueous dispersion of acrylic-based polymer fine particles (C) | | C-4 35 | C-5 35 | C-6 35 | C-1 60 | C-1 50 | C-1 20 | C-1 10 | C-1 35 | C-1 30 | C-1 35 | C-1 35 | C-1 35 | C-1 35 | C-1 35 | C-1 40 |
| | SAIMEL 325 | 10 | 10 | 10 | 10 | 10 | 10 | 10 | 19 | — | — | 10 | 10 | 10 | 10 | 10 |
| Luster pigment dispersion (AL) | Phosphate group-containing dispersed resin | 5 | 5 | 5 | 5 | 5 | 5 | 5 | 5 | 5 | 5 | — | 5 | 5 | 5 | 5 |
| | GX-180A | 17.5 | 17.5 | 17.5 | 17.5 | 17.5 | 17.5 | 17.5 | 17.5 | 17.5 | 17.5 | — | 17.5 | 17.5 | 17.5 | 17.5 |
| Pigment dispersion (P-2) | Hydroxyl-containing polyester resin (PE) | — | — | — | — | — | — | — | — | — | — | 5 | — | — | — | — |
| | JR-806 | — | — | — | — | — | — | — | — | — | — | 43.6 | — | — | — | — |

[Fabrication of Test Sheets]

Example 29

A degreased polypropylene board (PP board) was air spray coated with the primer coating (X-1) obtained in Production Example 5 to a cured film thickness of 15 μm, and an uncured primer coating film was formed on the PP board. The PP board with an uncured primer coating film was allowed to stand for 3 minutes and then preheated at 60° C. for 3 minutes. Next, the PP board having an uncured primer coating film was coated with the aqueous colored coating (Y-1) obtained in Example 1 to a cured film thickness of 15 μm using an electrostatic rotary atomizing coater, and an uncured base coating film was formed thereon.

The PP board with an uncured base coating film was allowed to stand for 5 minutes and preheated at 60° C. for 5 minutes. Next, the PP board with an uncured base coating film was coated with the clear coating material "SOFLEX #520 CLEAR" (trade name of Kansai Paint Co., Ltd., polyisocyanate compound-containing two-pack acrylurethane-based organic solvent-type clear coating material, hereunder also referred to as "clear coating material (Z-1)") to a cured film thickness of 35 μm using an electrostatic rotary atomizing coater, and an uncured clear coating film was formed thereon. The PP board with an uncured clear coating film was allowed to stand for 7 minutes and then heated at 80° C. for 30 minutes, thereby curing the primer coating film, base coating film and clear coating film at once to fabricate a test sheet.

Examples 30 to 55 and Comparative Examples 5 to 8

Test sheets were fabricated in the same manner as Example 29, except that the aqueous colored coating (Y-1) was changed to one of aqueous colored coatings (Y-2) to (Y-27) or (Y-29) to (Y-32) as shown in Table 4.

Example 56

A degreased polypropylene board (PP board) was air spray coated with the primer coating (X-1) obtained in Production Example 5 to a cured film thickness of 20 μm, and an uncured primer coating film was formed on the PP board. The PP board with an uncured primer coating film was allowed to stand for 3 minutes and then preheated at 60° C. for 3 minutes. Next, the PP board having an uncured primer coating film was coated with the aqueous colored coating (Y-28) obtained in Example 27 to a cured film thickness of 35 μm using an electrostatic rotary atomizing coater, and an uncured top coating film was formed thereon.

The PP board with an uncured clear coating film was allowed to stand for 3 minutes and preheated at 60° C. for 3 minutes. Next, the PP board with an uncured clear coating film was heated at 80° C. for 30 minutes, thereby curing the primer coating film and top coating film at once to fabricate a test sheet.

[Evaluation]

Each of the test sheets obtained in Examples 29 to 56 and Comparative Examples 5 to 8 was evaluated by the following test method. The results are summarized in Table 4.

[Test Methods]

Smoothness:

Each test sheet was scanned with a "Wave Scan DOI" (trade name of BYK Gardner) and evaluated based on the measured value of Wc. A smaller value for Wc means higher smoothness of the coating surface.

Distinctness of Image:

Each test sheet was scanned with a "Wave Scan DOI" (trade name of BYK Gardner) and evaluated based on the measured value of Wa. A smaller value for Wa means higher distinctness of image of the coating surface.

Adhesion after Water Resistance Test (Initial):

Each test sheet was immersed for 240 hours in warm water at 40° C. and then raised and dried at 20° C. for 12 hours, after which the multilayer coating film of the test sheet was notched in a lattice-like manner with a cutter reaching to the basis material, to form 100 square grids with sizes of 2 mm×2 mm. Next, cellophane tape was attached to the surface and the cellophane tape was abruptly peeled off at 20° C., after which the residual state of the square grid coating film was examined and evaluated according to the following scale.

VG: 100 of the square grid coating films remained, with no chipping of the edges of the coating films at the edges of the cutter notches.

G: 100 of the square grid coating films remained, but edges of the coating films at the edges of the cutter notches were chipped.

F: 90-99 of the square grid coating films remained.

P: 89 or fewer of the square grid coating films remained.

Adhesion after Water Resistance Test (After Storage):

Each aqueous colored coating (Y) was used after storage for 1 month at 40° C., to fabricate a test sheet with a multilayer coating film. Each test sheet was immersed for 240 hours in warm water at 40° C. and then raised and dried at 20° C. for 12 hours, after which the multilayer coating film of the test sheet was notched in a lattice-like manner with a cutter reaching to the basis material, to form 100 square grids with sizes of 2 mm×2 mm. Cellophane tape was attached to the surface and the cellophane tape was abruptly peeled off at 20° C., after which the residual state of the square grid coating film was examined.

VG: 100 of the square grid coating films remained, with no chipping of the edges of the coating films at the edges of the cutter notches.

G: 100 of the square grid coating films remained, but edges of the coating films at the edges of the cutter notches were chipped.

F: 90-99 of the square grid coating films remained.

P: 89 or fewer of the square grid coating films remained.

TABLE 4

|     |    | Primer coating material | Aqueous colored coating | Clear coating material | Smoothness | Distinctness of image | Adhesion after water resistance test (initial) | Adhesion after water resistance test (after storage) |
|-----|----|------|------|-----|----|----|----|----|
| Ex. | 29 | X-1 | Y-1  | Z-1 | 7  | 8  | VG | VG |
|     | 30 | X-1 | Y-2  | Z-1 | 7  | 8  | G  | G  |
|     | 31 | X-1 | Y-3  | Z-1 | 10 | 9  | G  | G  |
|     | 32 | X-1 | Y-4  | Z-1 | 13 | 14 | G  | G  |
|     | 33 | X-1 | Y-5  | Z-1 | 7  | 8  | VG | VG |
|     | 34 | X-1 | Y-6  | Z-1 | 7  | 9  | VG | VG |
|     | 35 | X-1 | Y-7  | Z-1 | 9  | 15 | VG | F  |
|     | 36 | X-1 | Y-8  | Z-1 | 7  | 10 | VG | VG |
|     | 37 | X-1 | Y-9  | Z-1 | 7  | 8  | VG | VG |
|     | 38 | X-1 | Y-10 | Z-1 | 7  | 10 | VG | VG |
|     | 39 | X-1 | Y-11 | Z-1 | 7  | 8  | VG | VG |
|     | 40 | X-1 | Y-12 | Z-1 | 7  | 8  | VG | VG |
|     | 41 | X-1 | Y-13 | Z-1 | 8  | 9  | G  | G  |
|     | 42 | X-1 | Y-14 | Z-1 | 8  | 8  | VG | VG |
|     | 43 | X-1 | Y-15 | Z-1 | 7  | 8  | G  | F  |
|     | 44 | X-1 | Y-16 | Z-1 | 9  | 9  | G  | G  |
|     | 45 | X-1 | Y-17 | Z-1 | 8  | 9  | G  | G  |
|     | 46 | X-1 | Y-18 | Z-1 | 9  | 8  | G  | G  |
|     | 47 | X-1 | Y-19 | Z-1 | 9  | 8  | G  | G  |
|     | 48 | X-1 | Y-20 | Z-1 | 9  | 9  | G  | G  |

TABLE 4-continued

|  |  | Primer coating material | Aqueous colored coating | Clear coating material | Smoothness | Distinctness of image | Adhesion after water resistance test (initial) | Adhesion after water resistance test (after storage) |
|---|---|---|---|---|---|---|---|---|
|  | 49 | X-1 | Y-21 | Z-1 | 15 | 9 | F | F |
|  | 50 | X-1 | Y-22 | Z-1 | 10 | 9 | G | G |
|  | 51 | X-1 | Y-23 | Z-1 | 10 | 8 | G | G |
|  | 52 | X-1 | Y-24 | Z-1 | 15 | 13 | F | F |
|  | 53 | X-1 | Y-25 | Z-1 | 9 | 9 | G | F |
|  | 54 | X-1 | Y-26 | Z-1 | 10 | 10 | VG | F |
|  | 55 | X-1 | Y-27 | Z-1 | 7 | 9 | G | G |
|  | 56 | X-1 | Y-28 | None | 8 | 9 | G | G |
| Comp. Ex. | 5 | X-1 | Y-29 | Z-1 | 17 | 18 | P | P |
|  | 6 | X-1 | Y-30 | Z-1 | 19 | 17 | P | P |
|  | 7 | X-1 | Y-31 | Z-1 | 20 | 23 | G | P |
|  | 8 | X-1 | Y-32 | Z-1 | 20 | 20 | P | P |

The present invention relates to the following aspects J1 to J11.

[J1]

An aqueous coating composition comprising:

an aqueous dispersion of an acryl-modified polyester resin (A);

a blocked polyisocyanate compound having a nonionic hydrophilic group (B); and an aqueous dispersion of acrylic-based polymer fine particles (C).

[J2]

An aqueous coating composition according to [J1], wherein the nonionic hydrophilic group of the blocked polyisocyanate compound (B) is a polyoxyalkylene group.

[J3]

An aqueous coating composition according to [J1] or [J2], wherein the blocked polyisocyanate compound (B) has an active methylene-based blocked isocyanate group.

[J4]

An aqueous coating composition according to any one of [J1] to [J3], wherein the blocked polyisocyanate compound (B) has at least one type of blocked isocyanate group selected from the group consisting of blocked isocyanate groups represented by the following formula (I):

[Chemical Formula 11]

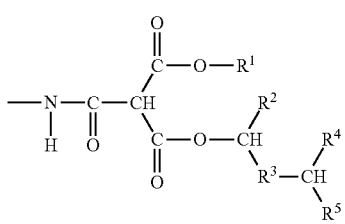

(I)

(wherein $R^1$, $R^2$, $R^4$ and $R^5$ independently represent a C1-C12 hydrocarbon group and $R^3$ represents a C1-C12 straight-chain or branched alkylene group), blocked isocyanate groups represented by the following formula (II):

[Chemical Formula 12]

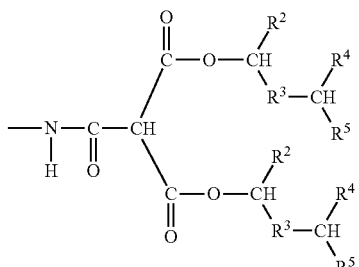

(II)

(wherein $R^2$, $R^3$, $R^4$ and $R^5$ have the same definitions as above), and blocked isocyanate groups represented by the following formula (III):

[Chemical Formula 13]

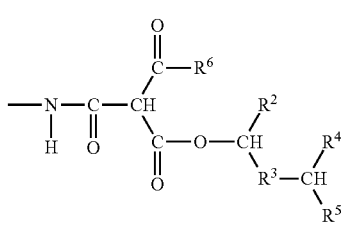

(III)

(wherein $R^2$, $R^3$, $R^4$ and $R^5$ have the same definitions as above, and $R^6$ represents a C1-C12 hydrocarbon group), and any combinations thereof.

[J5]

An aqueous coating composition according to [J4], wherein $R^1$ in formula (I) is an isopropyl group, and $R^6$ in formula (III) is an isopropyl group.

[J6]

An aqueous coating composition according to any one of [J1] to [J5], wherein the blocked polyisocyanate compound (B) includes a blocked polyisocyanate compound obtained by reacting a blocked polyisocyanate compound $(B_{11})$ having a blocked isocyanate group represented by the following formula (IV):

[Chemical Formula 14]

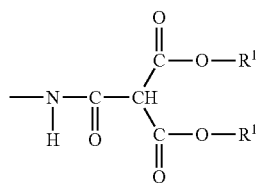
(IV)

(wherein the $R^1$ groups are as defined above, and each $R^1$ group may be the same or different),
and a nonionic hydrophilic group, with a secondary alcohol ($b_4$) represented by the following formula (VI):

[Chemical Formula 15]

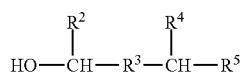
(VI)

(wherein $R^2$, $R^3$, $R^4$ and $R^5$ are as defined above).

[J7]

An aqueous coating composition according to any one of [J1] to [J6], wherein the blocked polyisocyanate compound (B) includes a blocked polyisocyanate compound obtained by reacting a blocked polyisocyanate compound ($B_{12}$) having a blocked isocyanate group represented by the following formula (V):

[Chemical Formula 16]

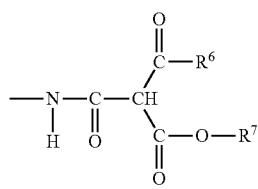
(V)

(wherein $R^6$ is as defined above, and $R^7$ represents a C1-12 hydrocarbon group), and a nonionic hydrophilic group, with a secondary alcohol ($b_4$) represented by the following formula (VI):

[Chemical Formula 17]

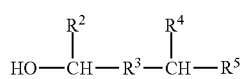
(VI)

(wherein $R^2$, $R^3$, $R^4$ and $R^5$ are as defined above).

[J8]

An aqueous coating composition according to any one of [J1] to [J7], comprising an aqueous dispersion of an acryl-modified polyester resin (A), a blocked polyisocyanate compound (B) and an aqueous dispersion of acrylic-based polymer fine particles (C) at 10 to 70 parts by mass, 1 to 30 parts by mass and 10 to 60 parts by mass, respectively, as solid content based on 100 parts by mass of the resin solid content in the aqueous coating composition.

[J9]

An aqueous coating composition according to any one of [J1] to [J8], further comprising a melamine resin (D).

[J10]

A method for producing a coated article, comprising:
a step of coating an article to be coated with an aqueous coating composition according to any one of [J1] to [J9] as a base coat material to form an uncured base coating film on the article to be coated, followed by
a step of coating the article to be coated having the uncured base coating film with a clear coating material, and forming an uncured clear coating film thereover.

[J11]

A method for producing a coated article, comprising:
a step of coating an article to be coated with an aqueous coating composition according to any one of [J1] to [J9] as a top coat material, and forming a top coating film on the article to be coated.

What is claimed is:

1. An aqueous coating composition comprising:
   an aqueous dispersion of an acryl-modified polyester resin (A);
   a blocked polyisocyanate compound having a nonionic hydrophilic group (B); and
   an aqueous dispersion of acrylic-based polymer fine particles; (C);
   wherein the blocked polyisocyanate compound (B) has at least one blocked isocyanate group selected from the group consisting of:
   blocked isocyanate groups of the following formula (I):

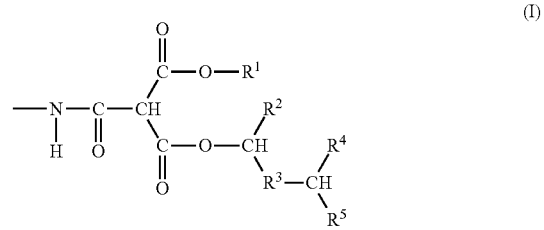
(I)

wherein $R^1$, $R^2$, $R^4$ and $R^5$ independently represent a C1-12 hydrocarbon group
and $R^3$ represents a C1-12 straight-chain or branched alkylene group;
blocked isocyanate groups of the following formula (II):

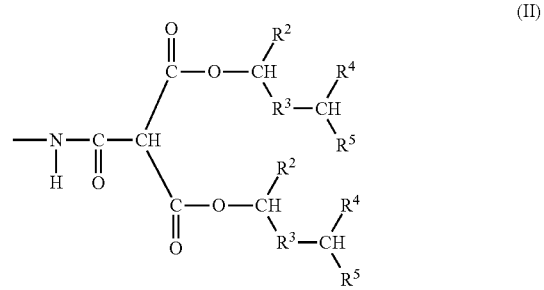
(II)

wherein $R^2$, $R^3$, $R^4$ and $R^5$ have the same definitions as above; and blocked isocyanate groups of the following formula (III):

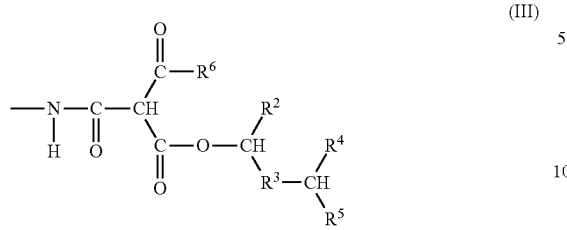

(III)

wherein $R^2$, $R^3$, $R^4$ and $R^5$ have the same definitions as above, and $R^6$ represents a C1-12 hydrocarbon group;
and any combination of said blocked isocyanate groups,
and
wherein the polyester resin of the acryl-modified polyester resin is obtained by reacting an acid component which comprises an acid anhydride group-containing unsaturated monomer and an alicyclic polybasic acid, with an alcohol component.

2. The aqueous coating composition according to claim 1, wherein the nonionic hydrophilic group of the blocked polyisocyanate compound (B) is a polyoxyalkylene group.

3. The aqueous coating composition according to claim 1, wherein $R^1$ in formula (I) is an isopropyl group, and $R^6$ in formula (III) is an isopropyl group.

4. The aqueous coating composition according to claim 1, wherein the blocked polyisocyanate compound (B) includes a blocked polyisocyanate compound obtained by reacting:
a blocked polyisocyanate compound ($B_{11}$) having a blocked isocyanate group represented by the following formula (IV):

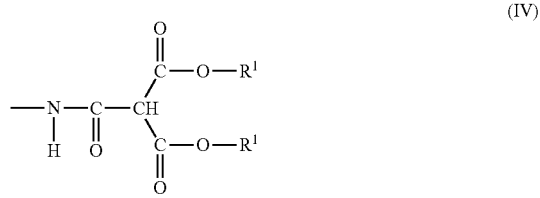

(IV)

wherein the $R^1$ groups are as defined above, and each $R^1$ group may be the same or different,
and a nonionic hydrophilic group, with a secondary alcohol ($b_4$) represented by the following formula (VI):

(VI)

wherein $R^2$, $R^3$, $R^4$ and $R^5$ are as defined above.

5. The aqueous coating composition according to claim 1, wherein the blocked polyisocyanate compound (B) includes a blocked polyisocyanate compound obtained by reacting:
a blocked polyisocyanate compound ($B_{12}$) having a blocked isocyanate group represented by the following formula (V):

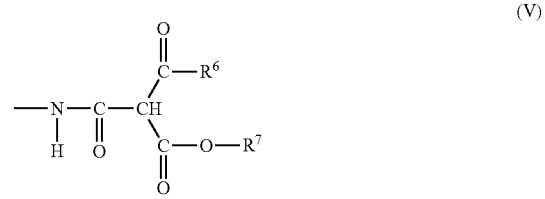

(V)

wherein $R^6$ is as defined above, and $R^7$ represents a C1-12 hydrocarbon group,
and a nonionic hydrophilic group, with a secondary alcohol ($b_4$) represented by the following formula (VI):

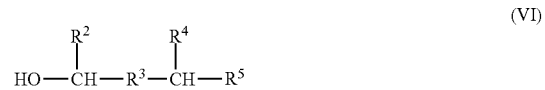

(VI)

wherein $R^2$, $R^3$, $R^4$ and $R^5$ are as defined above.

6. The aqueous coating composition according to claim 1, comprising an aqueous dispersion of an acryl-modified polyester resin (A), a blocked polyisocyanate compound (B) and an aqueous dispersion of acrylic-based polymer fine particles (C) at 10 to 70 parts by mass, 1 to 30 parts by mass and 10 to 60 parts by mass, respectively, as solid content based on 100 parts by mass of the resin solid content in the aqueous coating composition.

7. The aqueous coating composition according to claim 1, further comprising a melamine resin (D).

8. A method for producing a coated article, comprising:
a step of coating an article to be coated with an aqueous coating composition according to claim 1 as a base coat material to form an uncured base coating film on the article to be coated, followed by
a step of coating the article to be coated having the uncured base coating film with a clear coating material, and forming an uncured clear coating film thereover.

9. A method for producing a coated article, comprising:
a step of coating an article to be coated with an aqueous coating composition according to claim 1 as a top coat material, and forming a top coating film on the article to be coated.

10. The aqueous coating composition according to claim 1, wherein the acryl-modified polyester resin is obtained by reacting at least one polymerizable unsaturated monomer comprising an aromatic ring-containing polymerizable unsaturated monomer with a polyester resin.

11. The aqueous coating composition according to claim 10, wherein the acryl-modified polyester resin is obtained by radical polymerization of the polymerizable unsaturated monomer and the polyester resin.

* * * * *